(12) United States Patent
Lu et al.

(10) Patent No.: US 9,238,398 B2
(45) Date of Patent: Jan. 19, 2016

(54) REFRIGERATION SYSTEMS AND METHODS FOR CONNECTION WITH A VEHICLE'S LIQUID COOLING SYSTEM

(75) Inventors: Qiao Lu, Placentia, CA (US); William Godecker, Irvine, CA (US)

(73) Assignee: B/E AEROSPACE, INC., Wellington, FL (US)

( * ) Notice: Subject to any disclaimer, the term of this patent is extended or adjusted under 35 U.S.C. 154(b) by 1242 days.

(21) Appl. No.: 12/566,024

(22) Filed: Sep. 24, 2009

(65) Prior Publication Data

US 2010/0071384 A1    Mar. 25, 2010

Related U.S. Application Data

(60) Provisional application No. 61/100,170, filed on Sep. 25, 2008, provisional application No. 61/236,963, filed on Aug. 26, 2009.

(51) Int. Cl.

| | |
|---|---|
| *F25B 21/00* | (2006.01) |
| *F25D 17/00* | (2006.01) |
| *F25B 29/00* | (2006.01) |
| *B60H 1/00* | (2006.01) |
| *F25B 7/00* | (2006.01) |
| *F25D 15/00* | (2006.01) |
| *B64D 11/04* | (2006.01) |

(Continued)

(52) U.S. Cl.
CPC .............. *B60H 1/00592* (2013.01); *F25B 7/00* (2013.01); *F25D 15/00* (2013.01); *B64D 11/04* (2013.01); *B64D 2013/0629* (2013.01); *F25B 21/02* (2013.01); *F25B 2321/025* (2013.01); *F25B 2321/0212* (2013.01); *F25B 2321/0252* (2013.01); *F25D 17/06* (2013.01); *F25D 2700/12* (2013.01)

(58) Field of Classification Search
USPC .............. 62/3.61, 3.6, 79, 175, 335, 3.2, 244, 62/332, 238.6, 181, 183, 224; 165/104.14, 165/13; 361/700
See application file for complete search history.

(56) References Cited

U.S. PATENT DOCUMENTS 2,837,899 A * 6/1958 Lindenblad ............. F25B 21/02
136/204
3,040,539 A * 6/1962 Gaugler .................. F25B 21/02
136/204

(Continued)

FOREIGN PATENT DOCUMENTS

DE    20 2007 017 197 U1    4/2008

*Primary Examiner* — Frantz Jules
*Assistant Examiner* — Claire Rojohn, III
(74) *Attorney, Agent, or Firm* — Drinker Biddle & Reath LLP

(57) ABSTRACT

An exemplary refrigeration system for cooling food or beverages may use a liquid cooling system of a vehicle. The refrigeration system may include a compartment in which the food or beverages may be placed and removed, a chilled liquid coolant system having a connection through which liquid coolant is received from the liquid cooling system of the vehicle, and a heat exchanger operationally coupled with the chilled liquid coolant system and the compartment to transfer heat from the compartment into the liquid coolant. The refrigeration system may also include a second chilled coolant system through which a second coolant flows and a second heat exchanger operationally coupled with the second chilled coolant system and the compartment to transfer heat from the compartment. The chilled liquid coolant system and the second chilled coolant system may operate together as a cascade cooling system.

24 Claims, 9 Drawing Sheets

(51) Int. Cl.
*B64D 13/06* (2006.01)
*F25B 21/02* (2006.01)
*F25D 17/06* (2006.01)

(56) References Cited

U.S. PATENT DOCUMENTS

| | | | | |
|---|---|---|---|---|
| 3,052,100 A * | 9/1962 | Homkes | ................. | F25B 21/02 62/119 |
| 3,088,288 A * | 5/1963 | Elfving | ........................ | 62/3.61 |
| 3,138,934 A * | 6/1964 | Roane | ........................ | 62/3.3 |
| 3,167,925 A * | 2/1965 | Elfving | ................. | F25B 21/02 136/230 |
| 3,237,415 A * | 3/1966 | Newton | ........................ | 62/3.6 |
| 3,315,474 A * | 4/1967 | Farer | ................. | F25B 21/02 219/202 |
| 3,355,900 A * | 12/1967 | De Coye De Castelet | ............ | B60H 1/00478 62/244 |
| 3,483,710 A * | 12/1969 | Bearint | ................. | F25B 15/006 62/101 |
| 3,498,072 A * | 3/1970 | Stiefel | ................. | F24F 5/0003 62/118 |
| 3,799,831 A * | 3/1974 | Griffiths | ........................ | 156/297 |
| 3,886,346 A * | 5/1975 | Meyers | ................. | A47B 31/02 165/48.1 |
| 3,916,638 A * | 11/1975 | Schmidt | ........................ | 62/238.1 |
| 4,067,205 A * | 1/1978 | Mayhue | ................. | F24F 3/001 62/279 |
| 4,103,510 A * | 8/1978 | Hall | ........................ | 62/299 |
| 4,144,723 A * | 3/1979 | Morse | ................. | G21D 5/08 165/104.25 |
| 4,164,253 A * | 8/1979 | Skala | ................. | F24H 7/0433 126/400 |
| RE30,630 E * | 6/1981 | Morse | ................. | F02C 1/10 376/241 |
| 4,285,392 A * | 8/1981 | Rannow | ................. | F24D 3/18 165/50 |
| 4,297,849 A * | 11/1981 | Buffet | ........................ | 62/3.3 |
| 4,301,658 A * | 11/1981 | Reed | ................. | F25B 21/04 165/253 |
| 4,406,138 A * | 9/1983 | Nelson | ................. | F24F 5/001 62/119 |
| 4,505,124 A * | 3/1985 | Mayer | ........................ | 62/180 |
| 4,745,768 A * | 5/1988 | Schorr | ................. | F25B 27/00 62/238.3 |
| 4,873,839 A * | 10/1989 | Dessanti | ................. | F25B 11/00 62/238.3 |
| 4,916,913 A * | 4/1990 | Narikiyo | ........................ | 62/81 |
| 5,040,379 A * | 8/1991 | Fukunaga et al. | ........................ | 62/201 |
| 5,109,678 A * | 5/1992 | Jaster et al. | ........................ | 62/175 |
| 5,335,508 A * | 8/1994 | Tippmann | ................. | F25B 7/00 62/129 |
| 5,491,979 A | 2/1996 | Kull et al. | | |
| 5,513,500 A * | 5/1996 | Fischer et al. | ........................ | 62/239 |
| 5,528,900 A * | 6/1996 | Prasad | ........................ | 62/175 |
| 5,529,115 A * | 6/1996 | Paterson | ................. | F28D 15/02 165/104.21 |
| 5,551,240 A * | 9/1996 | Faries et al. | ........................ | 62/3.6 |
| 5,551,241 A * | 9/1996 | Boeckel et al. | ........................ | 62/3.6 |
| 5,551,248 A * | 9/1996 | Derosier | ........................ | 62/155 |
| 5,655,375 A * | 8/1997 | Ju | ........................ | 62/3.6 |
| 5,687,573 A * | 11/1997 | Shih | ........................ | 62/3.6 |
| 5,689,966 A * | 11/1997 | Zess | ................. | F25B 40/04 62/238.6 |
| 5,702,073 A * | 12/1997 | Fluegel | ........................ | 244/57 |
| 5,711,155 A * | 1/1998 | DeVilbiss et al. | ........................ | 62/3.7 |
| 5,761,921 A * | 6/1998 | Hori et al. | ........................ | 62/238.4 |
| 5,768,901 A * | 6/1998 | Dormer et al. | ........................ | 62/175 |
| 5,816,063 A * | 10/1998 | Schulak et al. | ........................ | 62/238.6 |
| 5,867,996 A * | 2/1999 | Takano et al. | ........................ | 62/175 |
| 5,871,041 A * | 2/1999 | Rafalovich et al. | ........................ | 165/10 |
| 5,987,892 A * | 11/1999 | Watanabe et al. | ........................ | 62/3.7 |
| 6,041,613 A * | 3/2000 | Morse | ................. | F25B 13/00 62/238.7 |
| 6,058,712 A * | 5/2000 | Rajasubramanian et al. | ... | 62/3.6 |
| 6,059,016 A * | 5/2000 | Rafalovich et al. | ............ | 165/41 |
| 6,148,906 A * | 11/2000 | Li | ................. | F28D 15/0233 165/104.26 |
| 6,205,803 B1 * | 3/2001 | Scaringe | ................. | F25B 5/02 165/104.33 |
| 6,222,113 B1 * | 4/2001 | Ghoshal | ................. | H01L 35/32 136/201 |
| 6,272,873 B1 * | 8/2001 | Bass | ........................ | 62/238.3 |
| 6,282,906 B1 * | 9/2001 | Cauchy | ................. | B60N 2/4686 62/244 |
| 6,327,865 B1 * | 12/2001 | Bonaquist et al. | ................. | 62/79 |
| 6,347,528 B1 * | 2/2002 | Iritani et al. | ........................ | 62/324.6 |
| 6,401,461 B1 * | 6/2002 | Harrison | ................. | F25B 21/02 62/3.61 |
| 6,401,462 B1 | 6/2002 | Bielinski | ........................ | 62/3.7 |
| 6,487,865 B1 * | 12/2002 | Luo | ................. | F25B 21/04 62/259.2 |
| 6,564,567 B2 * | 5/2003 | Skupin et al. | ........................ | 62/229 |
| RE38,128 E * | 6/2003 | Gallup et al. | ........................ | 62/3.5 |
| 6,595,009 B1 * | 7/2003 | Howard | ................. | F25B 7/00 62/335 |
| 6,598,404 B2 * | 7/2003 | Kruip | ........................ | 62/3.3 |
| 6,705,089 B2 * | 3/2004 | Chu et al. | ........................ | 62/3.2 |
| 6,732,533 B1 * | 5/2004 | Giles | ........................ | 62/3.3 |
| 6,772,603 B2 * | 8/2004 | Hsu et al. | ........................ | 62/259.2 |
| 6,779,354 B2 * | 8/2004 | Nakata | ........................ | 62/185 |
| 6,832,504 B1 * | 12/2004 | Birkmann | ................. | G01M 99/00 340/605 |
| 6,845,627 B1 * | 1/2005 | Buck | ........................ | 62/185 |
| 6,880,351 B2 * | 4/2005 | Simadiris et al. | ........................ | 62/185 |
| 6,941,764 B2 * | 9/2005 | Leroy et al. | ........................ | 62/237 |
| 7,007,501 B2 * | 3/2006 | Hu | ........................ | 62/435 |
| 7,073,338 B2 * | 7/2006 | Harwood et al. | ........................ | 62/3.61 |
| 7,096,925 B2 * | 8/2006 | Bracciano | ........................ | 165/42 |
| RE39,287 E * | 9/2006 | Bishop, II | ........................ | 62/3.61 |
| 7,147,071 B2 * | 12/2006 | Gering et al. | ........................ | 237/12.3 B |
| 7,149,084 B2 * | 12/2006 | Matsushima et al. | ........................ | 361/699 |
| 7,231,778 B2 * | 6/2007 | Rigney et al. | ........................ | 62/407 |
| 7,254,953 B2 * | 8/2007 | Callas et al. | ........................ | 62/3.7 |
| 7,264,046 B1 * | 9/2007 | Futernik et al. | ........................ | 165/202 |
| 7,287,385 B2 * | 10/2007 | Aldrich | ........................ | 62/3.2 |
| 7,308,796 B1 * | 12/2007 | Eager | ................. | F25B 21/02 62/3.2 |
| 7,310,953 B2 * | 12/2007 | Pham et al. | ........................ | 62/3.2 |
| 7,380,586 B2 * | 6/2008 | Gawthrop | ................. | B60H 1/004 165/202 |
| 7,469,555 B2 * | 12/2008 | Taras | ................. | F24F 3/153 62/510 |
| 7,629,530 B2 * | 12/2009 | Inaoka | ........................ | 136/205 |
| 7,779,639 B2 * | 8/2010 | Goenka | ........................ | 62/3.61 |
| 7,874,166 B2 * | 1/2011 | Reddin et al. | ........................ | 62/59 |
| 8,015,833 B2 * | 9/2011 | Cikanek et al. | ........................ | 62/115 |
| 8,141,620 B1 * | 3/2012 | Zrodnikov et al. | ........................ | 165/104.32 |
| 8,191,618 B2 * | 6/2012 | Gering et al. | ........................ | 165/202 |
| 8,196,648 B2 * | 6/2012 | Matsukawa | ................. | B60N 3/104 165/202 |
| 8,720,217 B2 * | 5/2014 | Reed | ................. | B64D 11/02 62/244 |
| 2002/0148239 A1 * | 10/2002 | Trieskey | ........................ | 62/79 |
| 2003/0014986 A1 * | 1/2003 | Crane et al. | ........................ | 62/183 |
| 2003/0029179 A1 * | 2/2003 | Vander Woude | ... | B60H 1/00014 62/201 |
| 2003/0079485 A1 * | 5/2003 | Nakata | ........................ | 62/185 |
| 2003/0115892 A1 * | 6/2003 | Fu | ................. | F25D 17/042 62/187 |
| 2003/0126866 A1 * | 7/2003 | Spry | ................. | B60N 2/4686 62/3.7 |
| 2003/0145606 A1 * | 8/2003 | Phelps et al. | ........................ | 62/3.6 |
| 2004/0025516 A1 * | 2/2004 | Van Winkle | ........ | B60H 1/00478 62/3.3 |
| 2004/0035142 A1 * | 2/2004 | Yoon et al. | ........................ | 62/441 |
| 2004/0068992 A1 * | 4/2004 | Cauchy | ................. | B60N 2/4686 62/3.61 |
| 2004/0139757 A1 * | 7/2004 | Kuehl et al. | ........................ | 62/237 |
| 2005/0016715 A1 * | 1/2005 | Werner | ................. | H01L 23/473 165/104.33 |
| 2005/0034466 A1 * | 2/2005 | Sato et al. | ........................ | 62/118 |
| 2005/0039878 A1 * | 2/2005 | Meyer et al. | ........................ | 165/42 |
| 2005/0072165 A1 * | 4/2005 | Bell | ........................ | 62/3.7 |

(56) References Cited

U.S. PATENT DOCUMENTS

| | | |
|---|---|---|
| 2005/0081534 A1* | 4/2005 | Suzuki et al. ............... 62/50.2 |
| 2005/0081540 A1* | 4/2005 | Hwang et al. ............... 62/175 |
| 2005/0099775 A1* | 5/2005 | Pokharna ............ H01L 23/3736 361/700 |
| 2005/0115257 A1* | 6/2005 | Goth et al. ............... 62/186 |
| 2005/0120737 A1* | 6/2005 | Borror ............... F25B 25/005 62/434 |
| 2005/0138935 A1* | 6/2005 | Shin et al. ............... 62/3.7 |
| 2005/0172652 A1* | 8/2005 | Ben Yahia ............... 62/239 |
| 2005/0178128 A1* | 8/2005 | Harwood ............ B60H 1/00271 62/3.61 |
| 2005/0223724 A1* | 10/2005 | Crane et al. ............... 62/175 |
| 2005/0252222 A1* | 11/2005 | Jessen et al. ............... 62/175 |
| 2006/0000228 A1* | 1/2006 | Fisher ............... 62/239 |
| 2006/0000583 A1* | 1/2006 | Lee ............... G06F 1/20 165/104.33 |
| 2006/0021366 A1* | 2/2006 | Plummer ............... 62/236 |
| 2006/0026982 A1* | 2/2006 | Yamamoto et al. ............... 62/239 |
| 2006/0032253 A1* | 2/2006 | Lee et al. ............... 62/175 |
| 2006/0037333 A1* | 2/2006 | Hwang et al. ............... 62/175 |
| 2006/0112706 A1* | 6/2006 | Inoue et al. ............... 62/238.3 |
| 2006/0123805 A1* | 6/2006 | Yuzawa ............... 62/114 |
| 2006/0144574 A1* | 7/2006 | Rosenfeld ............ C23C 30/00 165/104.33 |
| 2006/0185370 A1* | 8/2006 | Watanabe ............ F25B 9/145 62/6 |
| 2006/0185826 A1* | 8/2006 | Ohashi ............ F28D 15/0266 165/104.24 |
| 2006/0213206 A1* | 9/2006 | Linder ............ F25B 21/02 62/3.6 |
| 2006/0237182 A1* | 10/2006 | Godecker ............ A47J 39/02 165/253 |
| 2006/0272337 A1* | 12/2006 | Ito ............ B60N 2/5635 62/3.61 |
| 2006/0272798 A1* | 12/2006 | Liu ............ H01L 23/427 165/104.33 |
| 2006/0283199 A1* | 12/2006 | Gwin ............... 62/259.2 |
| 2007/0012427 A1* | 1/2007 | Liu ............ H01L 23/427 165/104.26 |
| 2007/0017666 A1* | 1/2007 | Goenka et al. ............... 165/202 |
| 2007/0074538 A1* | 4/2007 | Kurata et al. ............... 62/513 |
| 2007/0076376 A1* | 4/2007 | Mongia ............ G06F 1/20 361/700 |
| 2007/0084220 A1* | 4/2007 | Asada ............ B60N 2/448 62/3.61 |
| 2007/0101747 A1* | 5/2007 | Eisenhour ............... 62/332 |
| 2007/0101749 A1* | 5/2007 | Pham et al. ............... 62/332 |
| 2007/0101750 A1* | 5/2007 | Pham ............ F25B 25/00 62/332 |
| 2007/0113572 A1* | 5/2007 | Baruschke et al. ............... 62/239 |
| 2007/0137234 A1 | 6/2007 | Zywiak et al. |
| 2007/0157631 A1* | 7/2007 | Huang et al. ............... 62/3.3 |
| 2007/0158058 A1* | 7/2007 | Arshad et al. ............... 165/202 |
| 2007/0163270 A1* | 7/2007 | Chien et al. ............... 62/3.3 |
| 2007/0193291 A1* | 8/2007 | Reddin et al. ............... 62/239 |
| 2007/0193292 A1* | 8/2007 | Itoh ............... 62/239 |
| 2007/0193300 A1* | 8/2007 | Tilton et al. ............... 62/475 |
| 2007/0193721 A1* | 8/2007 | Tilton et al. ............... 165/104.19 |
| 2007/0199333 A1* | 8/2007 | Windisch ............... 62/3.5 |
| 2007/0204627 A1* | 9/2007 | Pan ............ F25B 21/02 62/3.2 |
| 2007/0234753 A1* | 10/2007 | Nemoto ............ F25B 25/005 62/335 |
| 2007/0240428 A1* | 10/2007 | Koga et al. ............... 62/3.1 |
| 2007/0240430 A1* | 10/2007 | Guldali et al. ............... 62/3.6 |
| 2007/0252039 A1* | 11/2007 | Wilmot, Jr. ............ B64D 13/06 244/118.5 |
| 2007/0256815 A1* | 11/2007 | Conway ............ G06F 1/183 165/80.4 |
| 2007/0283703 A1* | 12/2007 | Heckt ............ B60H 1/00907 62/3.61 |
| 2008/0055852 A1* | 3/2008 | Uluc ............ H05K 7/20218 361/696 |
| 2008/0092553 A1* | 4/2008 | Hochgraeber ............ B01L 7/00 62/3.6 |
| 2008/0155993 A1* | 7/2008 | Kuehl ............ F25B 25/00 62/3.6 |
| 2008/0173023 A1* | 7/2008 | Wu ............ F25B 21/02 62/3.6 |
| 2008/0209913 A1* | 9/2008 | Sung ............ B60H 1/2221 62/3.61 |
| 2008/0271478 A1* | 11/2008 | Pinto ............ F25B 39/024 62/515 |
| 2009/0201644 A1* | 8/2009 | Kelley ............ H05K 7/20836 361/699 |
| 2009/0288800 A1* | 11/2009 | Kang ............ B60N 3/104 165/42 |
| 2010/0236772 A1* | 9/2010 | Novotny ............ H05K 7/20836 165/287 |
| 2011/0056675 A1* | 3/2011 | Barringer ............ H05K 7/20736 165/299 |
| 2012/0222429 A1* | 9/2012 | Ban ............ B60H 1/00478 62/3.61 |
| 2013/0048264 A1* | 2/2013 | Lu ............ G05D 23/00 165/287 |
| 2014/0301036 A1* | 10/2014 | Chainer ............ H05K 7/2079 361/679.47 |

* cited by examiner

REFRIGERATION SYSTEMS AND METHODS FOR CONNECTION WITH A VEHICLE'S LIQUID COOLING SYSTEM

CROSS-REFERENCE TO RELATED PATENT APPLICATIONS

This application claims the priority benefit under 35 U.S.C. §119(e) from U.S. Provisional Patent Application No. 61/100,170 entitled "Galley Refrigerator Connected to Aircraft Supplemental Cooling System" and filed Sep. 25, 2008, the entire content of which is incorporated herein by reference. This application also claims the priority benefit under 35 U.S.C. §119(e) from U.S. Provisional Patent Application No. 61/236,963 entitled "A Cascade Thermoelectric Device Cooling System Design for a Vehicle Three-Mode Refrigerator" and filed Aug. 26, 2009, the entire content of which is incorporated herein by reference.

BACKGROUND

1. Field of the Invention

The present invention generally relates to refrigerators for use in a galley of a vehicle (e.g., an aircraft) for refrigerating food and beverage products. More specifically, the present invention relates refrigeration systems and methods for connection with a vehicle's liquid cooling system.

2. Related Art

As known in the art, conventional vehicle refrigerators and beverage chillers, such as those used in an aircraft galley, include a mechanical refrigeration apparatus that employs a vapor-compression refrigeration process (i.e., a vapor cycle system) to transfer heat from contents of the refrigerator to an environment external to the refrigerator. Although conventional vapor cycle aircraft galley refrigerators are suitable for their intended purpose, they have several drawbacks. One drawback is that the vapor cycle system of conventional refrigerators consume a significant amount of electrical energy. In addition, the vapor cycle system adds numerous mechanical and electrical parts to a conventional refrigerator, thereby making the refrigerator prone to malfunction. Furthermore, vapor cycle systems add significant weight and cause conventional refrigerators to occupy considerable space.

SUMMARY

An exemplary refrigeration system for cooling a removable object, such as food or beverages, may use a liquid cooling system of a vehicle. The refrigeration system may include a compartment in which the object may be placed and removed, a chilled liquid coolant system having a connection through which liquid coolant is received from the liquid cooling system of the vehicle, and a heat exchanger operationally coupled with the chilled liquid coolant system and the compartment to transfer heat from the compartment into the liquid coolant.

Another exemplary refrigeration system for cooling a removable object, such as food or beverages, may use a liquid cooling system of a vehicle. The refrigeration system may include a compartment in which the object may be placed and removed. The refrigeration system may also include a first chilled liquid coolant system having a connection through which first liquid coolant is received from the liquid cooling system of a vehicle and a first heat exchanger operationally coupled with the first chilled liquid coolant system and the compartment to transfer heat from the compartment into the first liquid coolant. The refrigeration system may also include a second chilled coolant system through which a second coolant flows and a second heat exchanger operationally coupled with the second chilled coolant system and the compartment to transfer heat from the compartment.

A method of cooling a refrigerated compartment using a liquid cooling system of a vehicle may include using reducing a temperature of a refrigerated compartment to a desired temperature using a first chilled liquid coolant system coupled with a liquid cooling system of a vehicle and a second chilled coolant system together as a cascade cooling system. The method may also include maintain the temperature of the refrigerated compartment at approximately the desired temperature using the first chilled liquid coolant system coupled with the liquid cooling system of the vehicle without using the second chilled coolant system to when the desired temperature is equal to or greater than approximately 3 degrees C. The method may additionally include maintaining the temperature of the refrigerated compartment at approximately the desired temperature using the first chilled liquid coolant system coupled with the liquid cooling system of the vehicle and the second chilled coolant system together as a cascade cooling system when the desired temperature is less than approximately 0 degrees C. The method may further include maintaining the temperature of the refrigerated compartment at approximately the desired temperature using the second chilled coolant system without using the first chilled liquid coolant system coupled with the liquid cooling system of the vehicle when the desired temperature is less than approximately 0 degrees C. and the second chilled coolant system includes a thermoelectric cooling system which is also coupled with the liquid cooling system of the vehicle.

DETAILED DESCRIPTION

Vehicles, such as aircraft, have recently included a liquid cooling system (hereinafter referred to as an LCS). The LCS typically provides a centralized refrigeration system in which chilled coolant is distributed from a central location throughout the aircraft for use in providing cooling to plenums within galleys into which food trolleys/carts are configured, as well as in providing cooling to in-flight entertainment electronics. The LCS typically includes a central refrigeration unit, a pump, and a liquid coolant tubing loop for circulating a chilled liquid coolant (e.g., PGW, a solution of 60% propylene glycol and water by volume, or Galden coolant, etc.) The chilled liquid coolant may be maintained at a chilled temperature by the LCS, such as −8 degrees C. The chilled liquid coolant is typically pumped throughout the aircraft to all galleys and their respective food service trolleys after being chilled by the central refrigeration unit.

A galley refrigerator that connects to the LCS would be beneficial over galley refrigerators of the prior art. Such a new refrigerator may have a lighter weight, have fewer internal parts, use less electrical energy, and be able to hold more contents due to the elimination of the vapor cycle system (or a substantial portion thereof) compared to the prior art. As a result, the galley refrigerator that connects to the LCS may have higher reliability and a reduced cost of ownership. In such a refrigerator that connects to the LCS and which does not include a self-contained vapor cycle system, there may not be a requirement for air flow around a condenser. Accordingly, air ducts may not be necessary to install in the galley for ejection of heat from the refrigerator.

Figure 1:
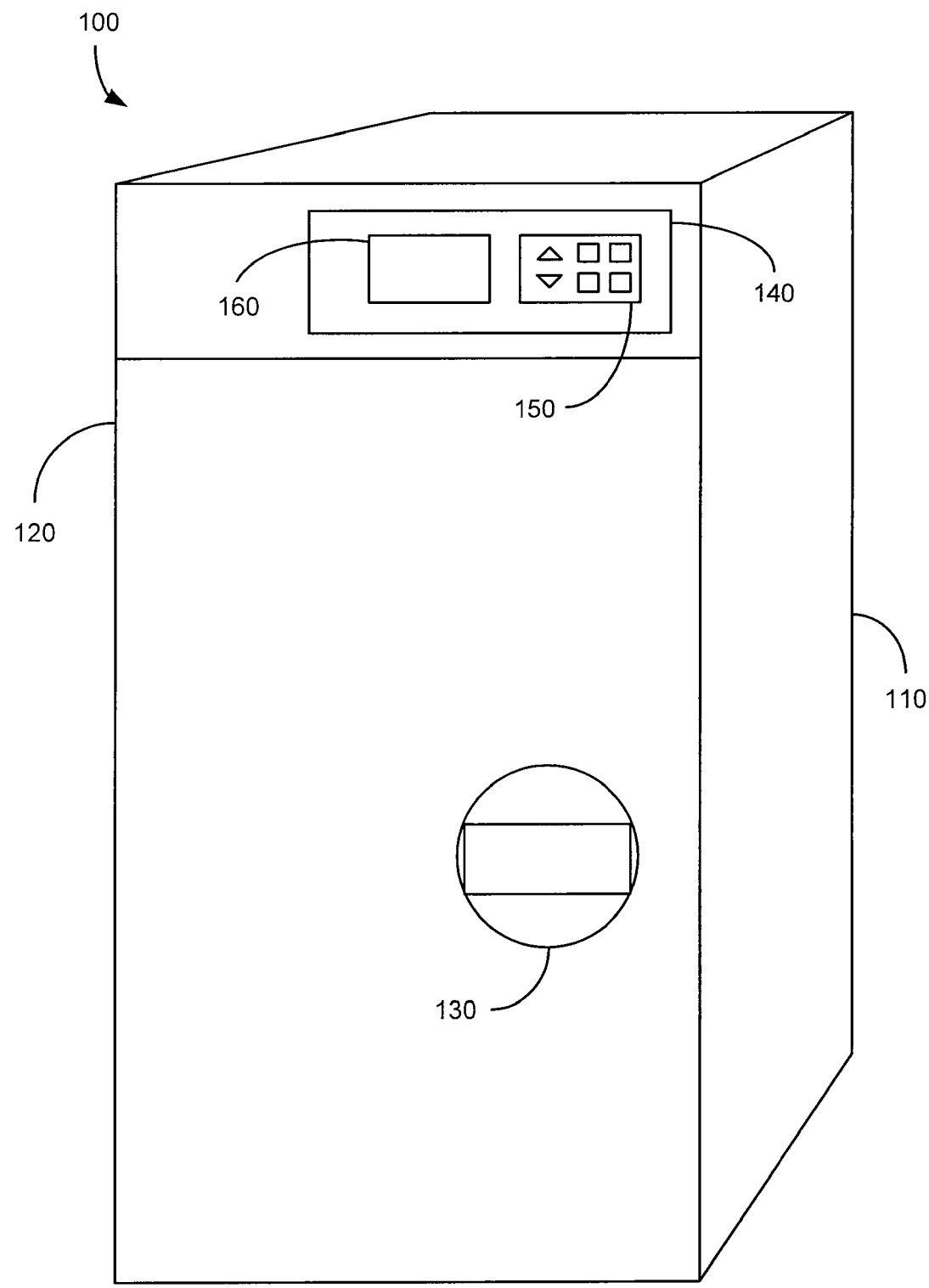
FIG. 1 illustrates a perspective view of an exemplary aircraft galley refrigerator.

FIG. 1 illustrates a perspective view of an exemplary aircraft galley refrigerator 100. The exemplary aircraft galley refrigerator 100 may be a line replaceable unit (LRU), and may provide refrigeration functionality while the aircraft is both on the ground and in flight. The refrigeration may be provided using a cooling system that may include a chilled liquid coolant system, a vapor cycle system, and/or a thermoelectric cooling system. The refrigerator 100 may be designed according to an ARINC 810 standard. The refrigerator 100 may be configured to operate using an electrical power source such as three phase 115 or 200 volts alternating current (VAC) at a frequency of 360 to 900 Hz. The refrigerator 100 may employ AC to DC power conversion to provide a predictable and consistent power source to a fan motor and/or valve actuators. The refrigerator 100 may also include a polyphase transformer (e.g., a 15-pulse transformer) to reduce current harmonics reflected from the refrigerator 100 back into an airframe power distribution system with which the refrigerator 100 may be coupled.

The refrigerator 100 includes an enclosure 110 (e.g., a chassis) having a door to a refrigerated compartment 120. The refrigerated compartment 120 may include an inner liner and thermal insulation. The inner liner may be constructed of stainless steel. The inner liner and/or the enclosure 110 may be grounded to provide a Faraday shield to help shield the refrigerator 100 from external electromagnetic interference (EMI) influences while containing internally generated high-frequency energy. Various embodiments of the refrigerator 100 may also include an EMI filter to reduce susceptibility to conducted EMI and emissions of EMI. The enclosure 110 may also include mounting rails, a removable air filter, a bezel, and wheels. The door to the refrigerated compartment 120 may include a door handle 130 with which the door may be opened or closed.

The refrigerator 100 may also include a control panel 140 having one or more input devices (e.g., control buttons or switches) 150, and a display panel (e.g., an LCD display or LED's) 160. The display panel 160 may provide a user interface display. The display panel 160 may be mounted on a grounded backplane to reduce RF emissions. An Indium Tin Oxide (ITO) on-polymer layer may be employed behind a display glass of the display panel 160 to block or reduce RF energy radiation. The refrigerator 100 may also include a controller coupled with the input devices 150 and the display panel 160. The controller may receive input commands from a user via the input devices 150, such as turning the refrigerator on or off, selecting an operation mode, and setting a desired temperature of the refrigerated compartment 120. The controller may output information to the user regarding an operational status (e.g., operational mode, activation of a defrost cycle, shut-off due to over-temperature conditions of the refrigerated compartment 120 and/or components of the refrigerator, etc.) of the refrigerator using the display panel 160. The controller may be coupled with the input devices 150 and the display panel 160 using shielded and twisted cables, and may communicate with the input devices 150 and/or the display panel 160 using an RS-232 communication protocol due to its electrically robust characteristics.

The controller may include an electronic circuit, printed circuit board, computing processor, memory comprising computing instructions, and/or data communications circuitry. The controller may be configured on or with an aluminum chassis or sheet metal box, which may be grounded and largely opaque to high-frequency energy transmission. Wires which carry high voltage and/or high frequency signals into or out of the refrigerator 100 may be twisted and/or shielded to reduce RF radiation, susceptibility, and EMI. Low frequency and low-voltage carrying wires may typically be filtered at the printed circuit board of the controller to bypass any high-frequency noise to ground.

The controller may be controlled by or communicate with a centralized computing system, such as one onboard an aircraft. The controller may implement a compliant ARINC 812 logical communication interface on a compliant ARINC 810 physical interface. The controller may communicate via a Galley Data Bus (e.g., galley networked GAN bus), and exchange data with a Galley Network Controller (e.g., Master GAIN Control Unit as described in the ARINC 812 specification). In accordance with the ARINC 812 specification, the controller may provide network monitoring, power control, remote operation, failure monitoring, and data transfer functions. The controller may implement menu definitions requests received from the Galley Network Controller (GNC) for presentation on a GNC Touchpanel display device and process associated button push events to respond appropriately. The controller may provide additional communications using an RS-232 communications interface and/or an infrared data port, such as communications with a personal computer (PC) or a personal digital assistance (PDA). Such additional communications may include real-time monitoring of operations of the refrigerator 100, long-term data retrieval, and control system software upgrades. In addition, a serial peripheral interface (SPI) bus may be used to communicate between the controller and motor controllers within the refrigerator 100.

The refrigerator 100 may be configured to refrigerate beverages and/or food products which are placed in the refrigerated compartment 120. The refrigerator 100 may operate in one or more of several modes, including refrigeration, beverage chilling, and freezing. A user may select a desired temperature for the refrigerated compartment 120 using the control panel 140. The controller included with the refrigerator 100 may control a temperature within the refrigerated compartment 120 at a high level of precision according to the desired temperature. Therefore, quality of food stored within the refrigerated compartment 120 may be maintained according to the user-selected operational mode of the refrigerator 100.

In various embodiments, the refrigerator 100 may maintain a temperature inside the refrigerated compartment 120 according to a user-selectable option among several preprogrammed temperatures, or according to a specific user-input temperature. For example, a beverage chiller mode may maintain the temperature inside the refrigerated compartment 120 at a user-selectable temperature of approximately 9 degrees C., 12 degrees C., or 16 degrees C. In a refrigerator mode, the temperature inside the refrigerated compartment 120 may be maintained at a user-selectable temperature of approximately 4 degrees C. or 7 degrees C. In a freezer mode, the temperature inside the refrigerated compartment 120 may be maintained at a user-selectable temperature of approximately −18 degrees C. to 0 degrees C.

In various embodiments, the refrigerator 100 may also include a fan assembly, which may have a fan motor, a motor controller, a blower assembly, and an over-temperature thermostat. The fan assembly may be operationally coupled with a heat exchanger, evaporator, and/or condenser. The refrigerator 100 may also include a plumbing system, which may have a liquid-to-air (e.g., forced convection) heat exchanger or a liquid conduction heat exchanger, a pressure vessel, a temperature control valve, a pressure relief burst disc, a temperature sensor, and one or more quick disconnects. In addition, the refrigerator 100 may include a power module having one or more printed circuit boards (PCB's), a wire harness, an ARINC connector, and/or a power conversion unit. The refrigerator 100 may also include ductwork and air interface components, and condensate drainage components.

The refrigerator 100 may also include one or more sensors such as temperature sensors and actuators. The sensors may be configured for air and refrigerant temperature sensing and pressure sensing, while the actuators may be configured for opening and closing valves. For example, an "RT1" evaporator inlet air temperature sensor may measure the temperature of air returning from the refrigerated compartment 120 to an evaporator of a vapor cycle refrigeration system, an "RT2" evaporator outlet air temperature sensor may measure the temperature of air supplied to the refrigerated compartment 120 from the evaporator, an "RT3" condenser inlet air or liquid temperature sensor may measure the temperature of ambient air or inlet liquid in the vicinity of the refrigerator 100, and an "RT4" exhaust air or liquid temperature sensor may measure the temperature of air exhausted or liquid outlet from the vapor cycle refrigeration system at a rear panel of the refrigerator 100. The controller may use data provided by the sensors to control operation of the refrigerator 100 using the actuators.

The controller may poll the sensors at a fixed minimum rate such that all data required to control the performance of the refrigerator 100 may be obtained by the controller in time for real-time operation of the one or more cooling systems within the refrigerator 100. The polled values may be reported by the controller via the RS-232 or infrared interface to a personal computer or PDA and may be reported over a controller area network (CAN) bus. The polled values may also be used in control algorithms by the controller, and may be stored to long-term memory or a data storage medium for later retrieval and analysis.

The controller may provide a self-protection scheme to protect against damage to the refrigerator 100 and its constituent components due to abnormal external and/or internal events such as over-temperature conditions, over-pressure conditions, over-current conditions, etc. and shut down the refrigerator 100 and/or one or more of its constituent components in accordance with the abnormal event. The self-protection scheme may include monitoring critical system sensors and taking appropriate self-protection action when monitored data from the sensors indicate a problem requiring activation of a self-protection action. Such a self-protection action may prevent the refrigerator 100 and/or its constituent components from being damaged or causing an unsafe condition. The self-protection action may also provide appropriate notification via the display panel 160 regarding the monitored problem, the self-protection action, and/or any associated maintenance required. The controller's self-protection scheme may supplement, rather than replace, mechanical protection devices which may also be deployed within the refrigerator 100. The controller may use monitored data from the sensors to intelligently restart the refrigerator 100 and reactivate the desired operational mode after the abnormal event which triggered the self-protection shutdown has terminated or reduced in severity.

The refrigerator 100 may be configured as a modular unit, and may be plug and play insert compatible with ARINC size 2 locations within the aircraft. The refrigerator 100 may have parts which are commonly shared with other galley inserts (GAINs), such as a refrigerator/oven unit. In some embodiments, the refrigerated compartment 120 may have an approximate interior volume of 40 liters for storing food items, and may be capable of storing 15 wine-bottle sized beverage bottles. In an exemplary embodiment, the refrigerator 100 may weigh approximately 14 kg when empty, and may have external dimensions of approximately 56.1 cm high, 28.5 cm wide, and 56.9 cm deep. Other embodiments may weigh more or less or have different external dimensions, depending on their application.

Figure 2:
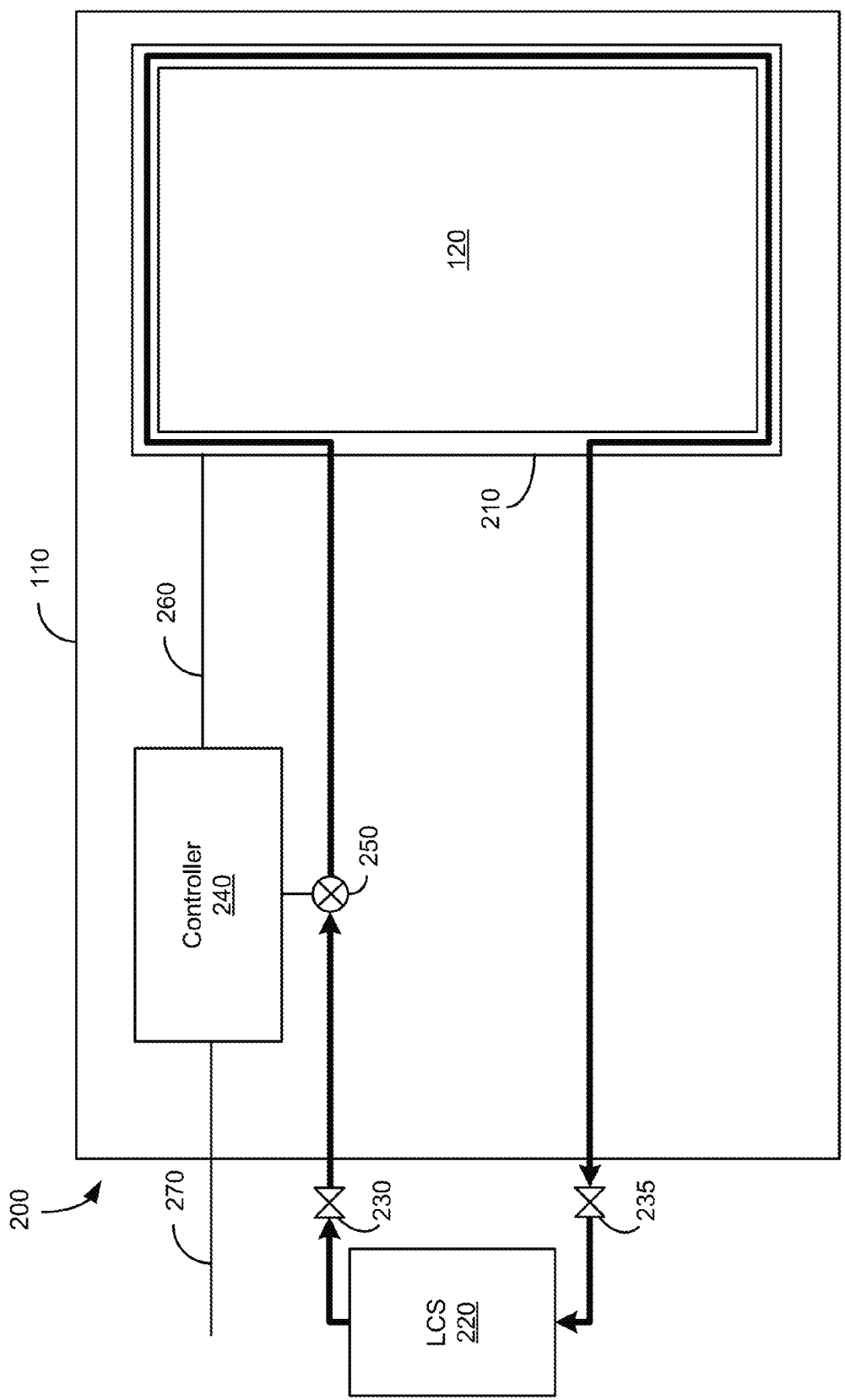
FIG. 2 illustrates an exemplary aircraft galley refrigerator having a cold wall conduction heat exchanger.

FIG. 2 illustrates an exemplary aircraft galley refrigerator 200 having a cold wall conduction heat exchanger 210. The cold wall conduction heat exchanger 210 may at least partially surround the refrigerated compartment 120 within the enclosure 110. The cold wall conduction heat exchanger 210 may receive cold liquid coolant from an aircraft liquid cooling system (LCS) 220 via an input quick disconnect 230, and output warmed liquid coolant to the LCS 220 via an output quick disconnect 235 after having absorbed heat from the refrigerated compartment 120 while flowing through the cold wall conduction heat exchanger 210. The construction of the cold wall conduction heat exchanger 210 in contact with the liner of the refrigerated compartment 120 may facilitate the conduction of heat from the foodstuffs and beverages within the refrigerated compartment 120 to the liquid coolant flowing through the cold wall conduction heat exchanger 210. Because the refrigerator may be a LRU, the quick disconnects 230 and 235 may facilitate the refrigerator being connected to and disconnected from the LCS 220 rapidly without spilling liquid coolant, for example during removal and reinstallation of the refrigerator for maintenance.

A controller 240 may control a coolant control valve (CCV) 250 to regulate a flow of the liquid coolant from the LCS 220 into the cold wall conduction heat exchanger 210 to maintain a precise temperature within the refrigerated compartment 120. The controller 240 may monitor air temperature within the refrigerated compartment 120 using one or more temperature sensors via a sensor monitor input 260. The controller may output data to and/or receive control commands and data from an external computing system via a data connection 270. In some embodiment, the CCV 250 may be normally closed and may open in proportion to a magnitude of an electrical signal received from the controller 240. The electrical signal may be related to a temperature measured within the refrigerated compartment 120. In some embodiments, the relationship between the magnitude of the electrical signal and the opening of the CCV 250 may be approximately linear. For example, the CCV 250 may be normally closed when the measured temperature within the refrigerated compartment 120 is at or below a desired threshold temperature, and may open to allow liquid coolant from the LCS 220 to flow into the cold wall conduction heat exchanger 210 in proportion to a temperature difference between the measured temperature of the refrigerated compartment 120 and the desired threshold temperature.

Figure 3:
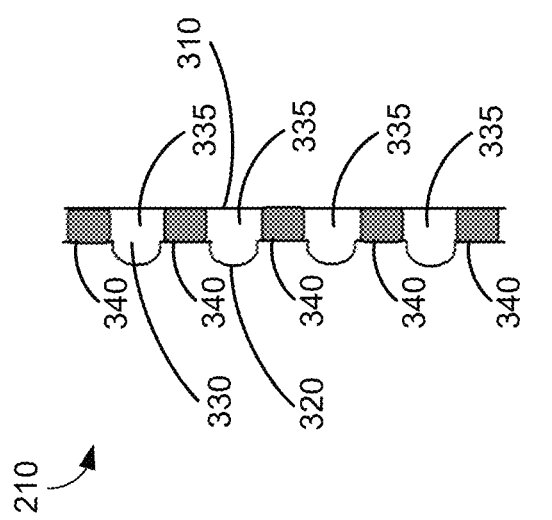
FIG. 3 illustrates an exemplary construction for the cold wall conduction heat exchanger of FIG. 2.

FIG. 3 illustrates an exemplary construction for the cold wall conduction heat exchanger 210 of FIG. 2. The cold wall conduction heat exchanger 210 may include an inner liner 310 constructed of sheet metal on a side facing an interior of the refrigerated compartment 120. The cold wall conduction heat exchanger 210 may also include an exterior surface 320 constructed of a material which is a good conductor of heat, such as sheet metal. A coolant circuit 330 may be formed between the inner liner 310 and the exterior surface 320. The coolant circuit 330 may include closed channels 335 through which the liquid coolant from the LCS 220 flows. The closed channels 335 of the coolant circuit 330 may be separated by brazing material 340. The coolant circuit 330 may be stamped onto the sheet metal of the inner liner 310 and/or the exterior surface 320 with graphite and may be assembled by a rolling process.

Figure 4:
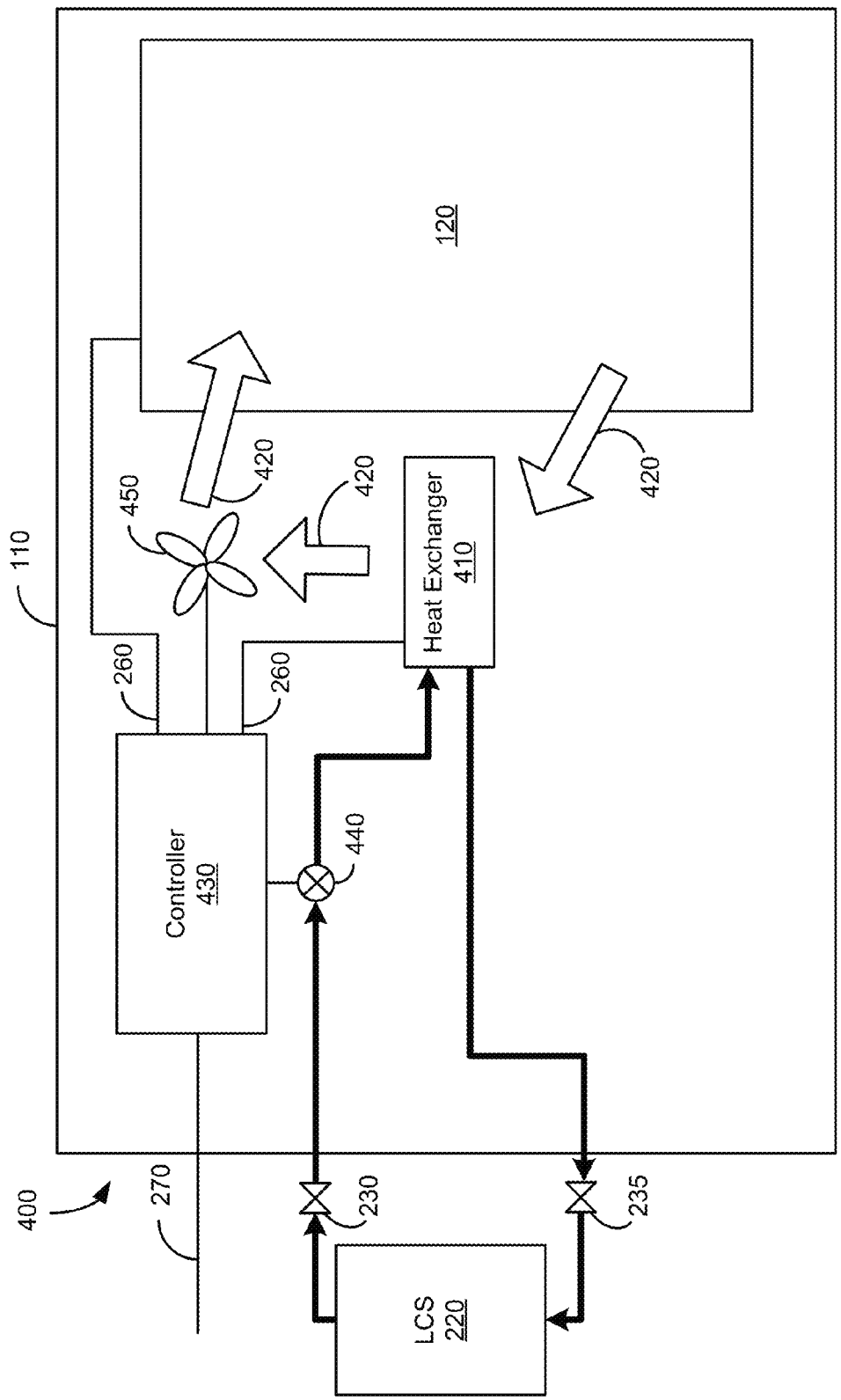
FIG. 4 illustrates an exemplary aircraft galley refrigerator having a liquid-to-air heat exchanger.

FIG. 4 illustrates an exemplary aircraft galley refrigerator 400 having a liquid-to-air heat exchanger 410. The liquid-to-air heat exchanger 410 may include a forced air convection heat exchanger. As opposed to the refrigerator 200 illustrated in FIG. 2 which had one cooling loop, the refrigerator 400 effectively has two cooling loops. The first cooling loop comprises the liquid coolant provided to the refrigerator 400 by the LCS 220. The second cooling loop comprises circulation of air 420 through the refrigerated compartment 120 and the liquid-to-air heat exchanger 410. Heat from food and/or beverages in the refrigerated compartment 120 may be transferred to the air 420 which circulates therein. The liquid-to-air heat exchanger 410 may then transfer the heat from the circulating air 420 to the liquid coolant from the LCS 220.

A controller 430 may control a coolant control valve (CCV) 440 to regulate a flow of the liquid coolant from the LCS 220 into the liquid-to-air heat exchanger 410 to maintain a precise temperature within the refrigerated compartment 120. In this respect, the controller 430 may function in a manner similar to that described with reference to the controller 240 of FIG. 2. The controller may measure the temperature of the air 420 at one or more places in the second cooling loop, such as where the air 420 enters the liquid-to-air heat exchanger 410, exits the liquid-to-air heat exchanger 410, and/or circulates within the refrigerated compartment 120. The controller may directly control the temperature of the air 420 at a location where the air 420 is measured by actuating the CCV 440, and thereby indirectly control a temperature within the refrigerated compartment 120. In addition, the controller 430 may control a fan 450 to force the circulating air 420 to circulate through the refrigerated compartment 120 and the liquid-to-air heat exchanger 410. The controller 430 may cause the fan 450 to rotate faster or slower depending upon a measured temperature within the refrigerated compartment 120, the circulating air 420 before or after passing through the liquid-to-air heat exchanger 410, and/or a state of the CCV 440. The controller 430 may coordinate control of the CCV 440 and the fan 450. The controller 430 may also monitor a thermal switch of the fan 450 which may indicate when the fan 450 has reached an over temperature condition. When the fan 450 overheats, the fan 450 may stop operating due to its thermal switch. The controller 430 may then adjust operations of the refrigerator 400 accordingly, such as by closing the CCV 440, until the over temperature condition has been corrected and the fan 450 may once again be operated.

The fan 450 may include a centrifugal type fan. A centrifugal fan may provide a higher aerodynamic efficiency than other types of fans at the airflow requirements of the refrigerator 400. Accordingly, a centrifugal fan may therefore minimize any loss of performance due to rejected heat. A centrifugal type fan may also minimize space requirements, facilitating a more compact refrigerator enclosure 110. Air ducts (not shown) may be installed in the enclosure 110 to direct the circulating air 420 out of the refrigerated compartment 120, through the liquid-to-air heat exchanger 410, through the fan 450, and back into the refrigerated compartment 120.

The controller 430 may also control a defrost cycle of the refrigerator, and provide a signal that the defrost cycle is in progress. The controller 430 may sense ice buildup using a pressure difference device, or the controller 430 may perform the defrost cycle at regular intervals as estimated by an internal timer. The defrost cycle may include closing the CCV 440 while operating the fan 450 to circulate the air 420 until all ice is melted. After the defrost cycle is complete, the fan 450 may be shut off for a period of approximately 30 seconds to allow water which may adhere to the heat exchanger 410 to drop off and drain. Throughout the defrost cycle, condensed water may be collected in a bottom tray of the refrigerator 400 for cleaning.

Figure 5:
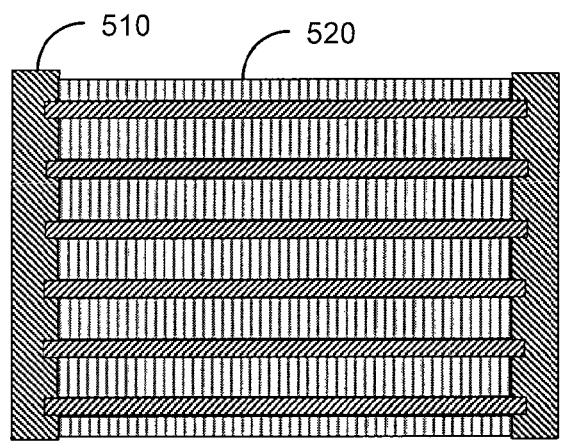
FIG. 5 illustrates a front view of an exemplary liquid-to-air heat exchanger.

FIG. 5 illustrates a front view of an exemplary liquid-to-air heat exchanger. The exemplary liquid-to-air heat exchanger may include an embodiment of the liquid-to-air heat exchanger 410. The liquid-to-air heat exchanger may include a coolant liquid circuit 510 which includes channels through which liquid coolant, such as that provided by the LCS 220 illustrated in FIG. 4, flows. The liquid-to-air heat exchanger may also include a plurality of plates/fins 520 coupled with the coolant liquid circuit 510. Air, such as the circulating air 420, may be blown through the plurality of plates/fins 520 to cool the circulating air 420 using the liquid coolant flowing through the coolant liquid circuit 510. The plates/fins 520 may efficiently conduct heat to facilitate the transfer of heat from the air to the liquid coolant. The construction of the liquid-to-air heat exchanger including the plates/fins 520 may minimize its size and weight for the required heat exchange performance. The liquid-to-air heat exchanger may be constructed of a strong yet light-weight material such as a high strength aluminum alloy. The liquid-to-air heat exchanger may also include suitable corrosion protection for both internal passages of the coolant liquid circuit 510 and external surfaces. The corrosion protection may be typical of commercial aircraft applications.

Figure 6:
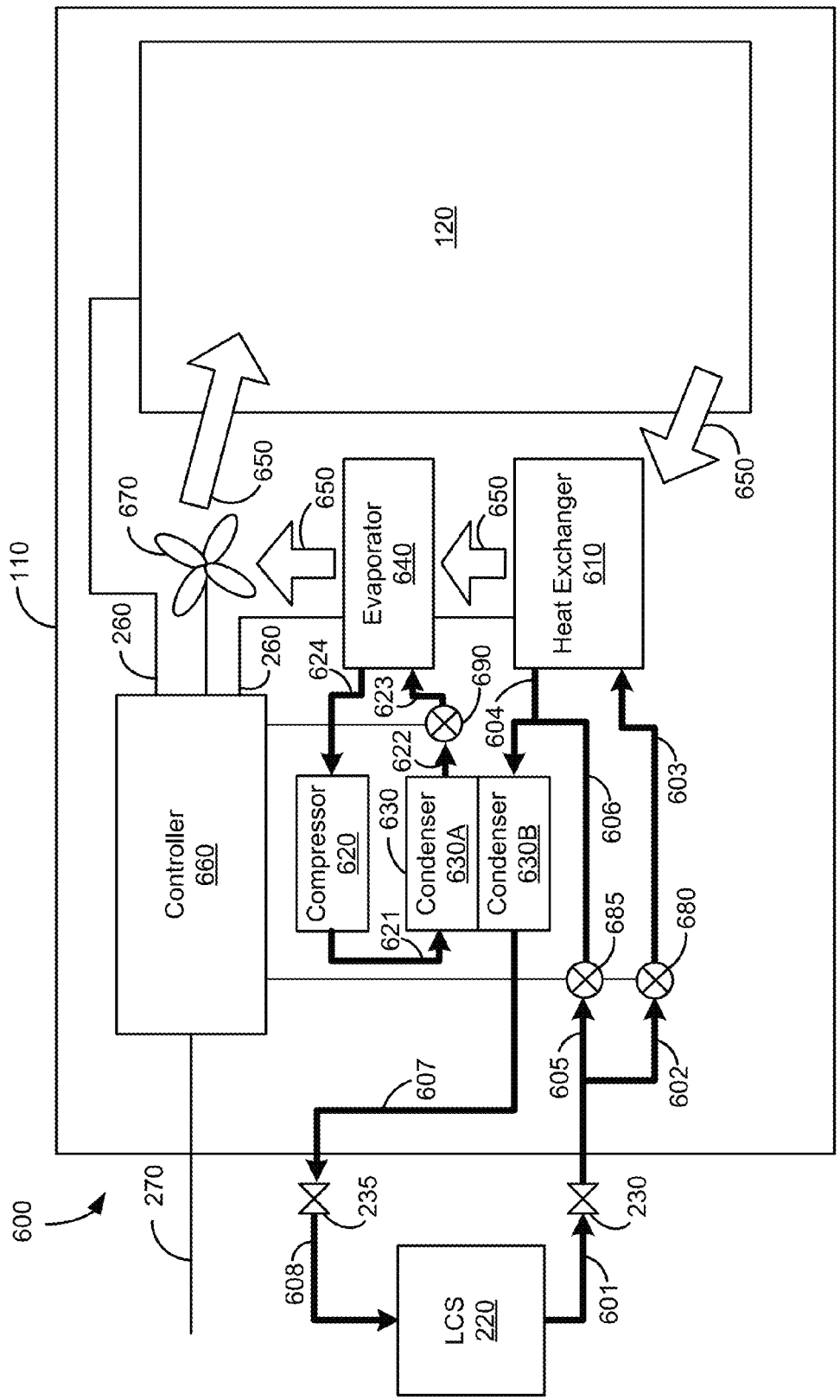
FIG. 6 illustrates an exemplary aircraft galley refrigerator having a cascade cooling system.

FIG. 6 illustrates an exemplary aircraft galley refrigerator 600 having a cascade cooling system. The refrigerator 600 effectively has three cooling loops provided by two cooling systems. A chilled liquid coolant system using liquid coolant provided by the LCS 220 includes a liquid-to-air heat exchanger 610 in the first of the three cooling loops. The chilled liquid coolant system includes coolant flow path 601 from the LCS 220 to the input quick disconnect 230, coolant flow path 602 from the input quick disconnect 230 to a CCV 680, coolant flow path 603 from the CCV 680 to the liquid-to-air heat exchanger 610, coolant flow path 604 from the liquid-to-air heat exchanger 610 to a condenser secondary coolant circuit 630B of a condenser 630, coolant flow path 605 from the input quick disconnect 230 to a CCV 685, coolant flow path 606 from the CCV 685 to the condenser secondary coolant circuit 630B, coolant flow path 607 from the condenser secondary coolant circuit 630B to the output quick disconnect 235, and coolant flow path 608 from the output quick disconnect 235 to the LCS 220. The combination of coolant flow paths 602, 603, and 604 and a coolant flow path through the liquid-to-air heat exchanger 610 is in parallel with the combination of coolant flow paths 605 and 606. The liquid-to-air heat exchanger 610 may include an embodiment of the liquid-to-air heat exchanger illustrated in FIG. 5. A refrigerant vapor cycle system includes a compressor 620, the condenser 630, and an evaporator 640 in the second of the three cooling loops. The refrigerant vapor cycle system includes coolant flow path 621 from the compressor 620 to a condenser refrigerant circuit 630A of the condenser 630, coolant flow path 622 from the condenser refrigerant circuit 630A to a refrigerant expansion valve (REV) 690, coolant flow path 623 from the REV 690 to the evaporator 640, and coolant flow path 624 from the evaporator 640 to the compressor 620. The coolant flow paths of the refrigerant vapor cycle system are separate from and not connected to the coolant flow paths of the chilled liquid coolant system. The third cooling loop includes circulating air 650 which flows through the refrigerated compartment 120, the liquid-to-air heat exchanger 610, and the evaporator 640. At any given time, one or both of the chilled liquid coolant system and the refrigerant vapor cycle system may be used to cool the refrigerated compartment 120 via the circulating air 650. The liquid-to-air heat exchanger 610 may cool the refrigerated compartment 120 by transferring heat from the circulating air 650 to the liquid coolant provided by the LCS 220 in a manner similar to that explained with reference to FIG. 4. Similarly, the evaporator 640 may cool the refrigerated compartment 120 by transferring heat from the circulating air 650 to the refrigerant circulating within the refrigerant vapor cycle system.

The condenser 630 within the refrigerant vapor cycle system may be liquid cooled using the liquid coolant provided by the LCS 220. Accordingly, heat from the condenser 630, including heat transferred from the refrigerant to the condenser 630 in a condenser refrigerant circuit 630A, may be transferred to the liquid coolant in a condenser secondary coolant circuit 630B prior to returning the liquid coolant to the LCS 220.

A controller 660 may control the operation of one or both of the refrigerant vapor cycle system and the chilled liquid coolant system to maintain a desired temperature within the refrigerated compartment 120. The controller 660 may also control a fan 670 to force the circulating air 650 through the refrigerated compartment 120, the liquid-to-air heat exchanger 610, and the evaporator 640. The controller 660 may coordinate control of the fan 670 with control of the one or both of the refrigerant vapor cycle system and the chilled liquid coolant system.

The controller 660 may control the CCV 680 and the CCV 685 to control the flow of liquid coolant from the LCS 220 into the liquid-to-air heat exchanger 610 and/or the condenser secondary coolant circuit 630B in a manner similar to that described with reference to the controllers 240 and 440 of FIGS. 2 and 4, respectively. For example, when the refrigerant vapor cycle system is being controlled to cool the circulating air 650 using the evaporator 640 while the liquid-to-heat exchanger 610 of the chilled liquid coolant system is not being used, the controller 660 may control the CCV 685 to be open and the CCV 680 to be closed such that liquid coolant flows from the LCS 220 through the condenser secondary coolant circuit 630B while no liquid coolant flows through the liquid-to-air heat exchanger 610. Meanwhile, the controller 660 may control the REV 690 to be open such that refrigerant flows through the condenser refrigerant circuit 630A into the evaporator 640. Alternatively, when the chilled liquid coolant system is being controlled to cool the circulating air 650 using the liquid-to-heat exchanger 610 while the evaporator 640 of the refrigerant vapor cycle system is not being used, the controller 660 may control the CCV 685 to be closed and the CCV 680 to be open such that liquid coolant flows from the LCS 220 through the liquid-to-air heat exchanger 610. Meanwhile, the controller 660 may control the REV 690 to be closed such that refrigerant does not flow through the condenser refrigerant circuit 630A or the evaporator 640. When both the liquid-to-heat exchanger 610 of the chilled liquid coolant system and the evaporator 640 of the refrigerant vapor cycle system are being controlled to cool the circulating air 650, the controller 660 may cause the CCV 680 to be open such that liquid coolant from the LCS 220 flows through the liquid-to-air heat exchanger 610 and the REV 690 to be open such that refrigerant flows through the condenser refrigerant circuit 630A into the evaporator 640. The controller 660 may control the CCV 685 to be closed such that only the liquid coolant from the liquid-to-air heat exchanger 610 flows through the condenser secondary coolant circuit 630B, or to be open such that a mixture of liquid coolant from the liquid-to-air heat exchanger 610 and the LCS 220 directly flow through the condenser secondary coolant circuit 630B.

The exemplary refrigerator 600 may be configured as a self-contained galley refrigeration insert which may be operated in one of several modes, each of which may cool the refrigerated compartment 120 to a different temperature range. A beverage chiller mode may cool the refrigerated compartment 120 to a temperature range of approximately 46 to 61 degrees F. (8 to 16 degrees C.), a refrigerator mode may cool the refrigerated compartment 120 to a temperature range of approximately 39 to 45 degrees F. (4 to 7 degrees C.), and a freezer mode may cool the refrigerated compartment 120 to a temperature range of approximately 0 to 10 degrees F. (−18 to −12 degrees C.) or 16 to 32 degrees F. (−3 to 0 degrees C.). When the refrigerator is operated in the beverage chiller and refrigerator modes, cooling may be provided by the chilled liquid coolant system. When the refrigerator 600 is operated in the freezer mode, the refrigerant vapor cycle system may be employed in addition to the chilled liquid coolant system, thereby providing a cascade cooling system.

When the temperature within the refrigerated compartment 120 is higher than a desired temperature for an operating mode of the refrigerator 600 and the temperature within the refrigerated compartment 120 is to be pulled down to the desired temperature (e.g., by a pull-down process of the refrigerator 600 in which the cooling effort is maximized to quickly reduce the temperature of the refrigerated compartment 120 to the desired temperature), both the chilled liquid coolant system and the refrigerant vapor cycle system may be operated together as a cascade cooling system. In this mode, warm circulating air 650 from the refrigerated compartment 120 may be circulated through the liquid-to-air heat exchanger 610 and then through the evaporator 640 to be cooled prior to returning to the refrigerated compartment 120. Once the temperature within the refrigerated compartment 120 is pulled down to a desired temperature, operation of the refrigerator 600 may include either or both of the refrigerant vapor cycle system and the chilled liquid coolant system depending upon a temperature of the liquid coolant provided by the LCS 220, an air temperature of the refrigerated compartment 120 and/or the circulating air 650, and the operating mode of the refrigerator 600.

For example, when the refrigerator 600 is operating in freezer mode, and a measured temperature of the circulating air 650 at the evaporator 640 or the liquid-to-air heat exchanger 610 is less than −6 degrees C., the chilled liquid coolant system may be turned off while the refrigerant vapor cycle system remains operating (e.g., the CCV 680 may be closed while the CCV 685 and REV 690 are open).

As another example, when the refrigerator is operating in beverage chiller mode, and a measured temperature of the circulating air 650 output from the evaporator 640 or the liquid-to-air heat exchanger 610 is less than 8 degrees C., the refrigerant vapor cycle system may be turned off while the chilled liquid coolant system remains operating (e.g., the REV 690 and CCV 685 may be closed while the CCV 680 is open). However, in this example, when a temperature of the liquid coolant from the LCS 220 is higher than approximately 7 degrees C., the refrigerant vapor cycle system may be turned on, either in addition to or in place of the chilled liquid coolant system.

As yet another example, when the liquid coolant provided by the LCS 220 is maintained at a temperature of approximately −8 degrees C., the chilled liquid coolant system may be turned on while the refrigerant vapor cycle system is turned off in both the refrigerator mode and the beverage chiller mode. However, when the liquid coolant provided by the LCS 220 is at a temperature higher than approximately 5 degrees C., the refrigerant vapor cycle system may be turned on. When the liquid coolant provided by the LCS 220 is at a temperature higher than approximately 40 degrees C., the refrigerant vapor cycle system and the chilled liquid coolant system may both be turned off for safety purposes.

Figure 7:
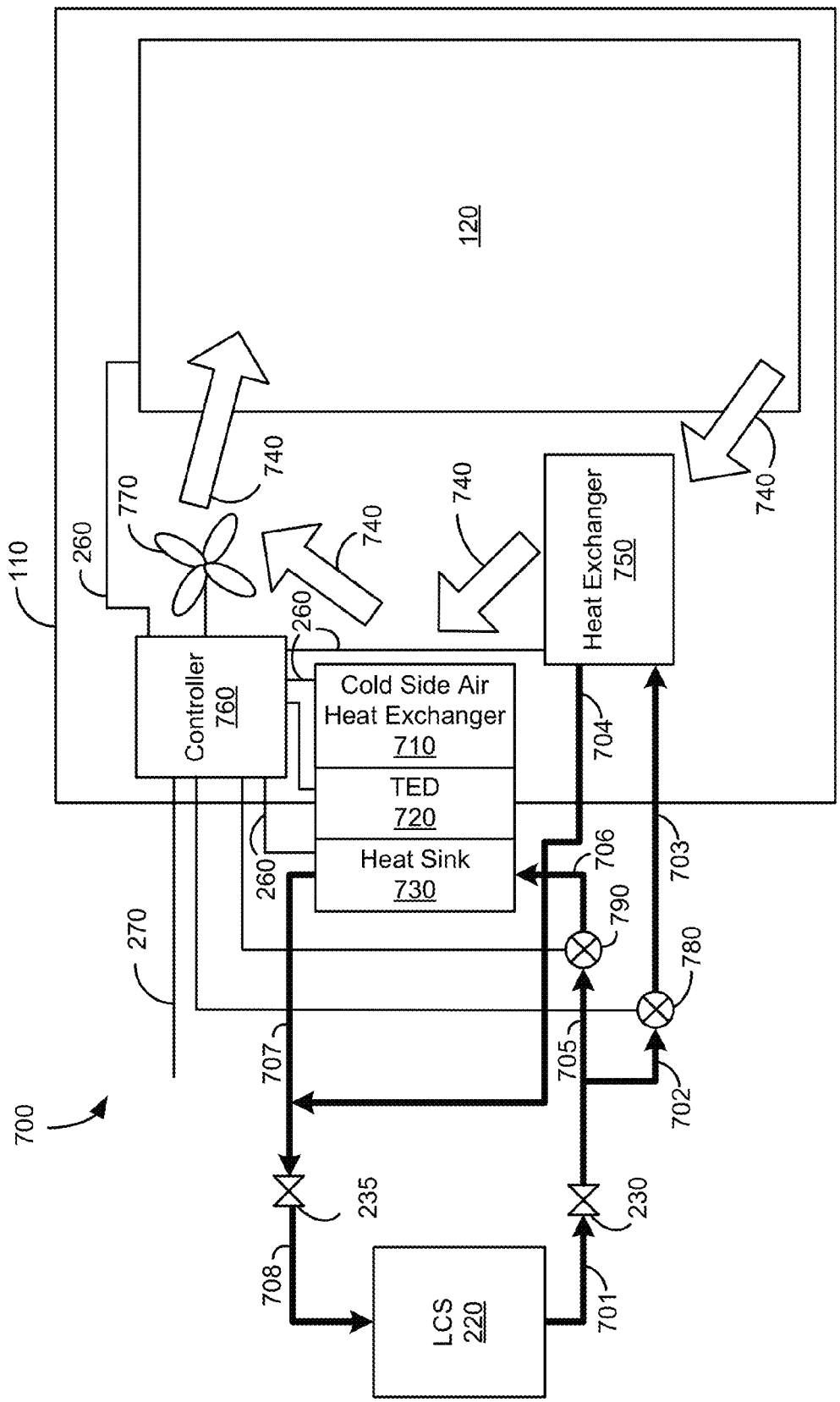
FIG. 7 illustrates an exemplary aircraft galley refrigerator having a thermoelectric cascade cooling system with a cold side air heat exchanger.

FIG. 7 illustrates an exemplary aircraft galley refrigerator 700 having a thermoelectric cascade cooling system with a cold side air heat exchanger 710. The exemplary refrigerator 700 may operate as a cascade cooling system employing thermoelectric (TE) cooling using a thermoelectric cooling system (TECS). The thermoelectric cooling system may include one or more thermoelectric devices (TED) 720 coupled with the thermoelectric cold side air heat exchanger 710 on one side and a liquid cooled thermoelectric hot side heat sink 730 on the other side. The TED 720 may be coupled with the thermoelectric cold side air heat exchanger 710 and/or the liquid cooled thermoelectric hot side heat sink 730 using a thermal interface material. The TED 720 may function using principles of the Peltier Effect, in which a voltage or DC current is applied across two dissimilar conductors, thereby creating an electrical circuit which transfers heat in a direction of charge carrier movement. In this manner, the TED 720 may transfer (i.e., pump) heat from the cold side air heat exchanger 710 to the heat sink 730. The cold side air heat exchanger 710 may absorb heat from circulating air 740 which circulates through the refrigerated compartment 120, a liquid-to-air heat exchanger 750 which is coupled with the LCS 220, and the cold side air heat exchanger 710. The TED 720 may transfer the heat absorbed by the cold side air heat exchanger 710 to the heat sink 730. The heat sink 730 may include a liquid-cooled heat sink which transfers the heat received from the TED 720 (i.e., the rejected heat) to the liquid coolant provided by the LCS 220. The heat sink 730 may also transfer heat generated by the TED 720 itself to the liquid coolant. The TED 720 may be mounted on the enclosure 110 such that heat from within the enclosure 110 is pumped from the cold side air heat exchanger 710 by the TED 720 to the heat sink 730 on the outside of the enclosure 110. The cold side air heat exchanger 710 may be mounted on the inward facing side of the TED 720, while the heat sink 730 may be mounted on the outward facing side of the TED 720. The cold side air heat exchanger 710 may be cooled by the TED 720 to a temperature below that of air within the enclosure 110 (e.g., circulating air 740), and may absorb heat from the air as the air circulates between fins of the cold side air heat exchanger 710.

As illustrated and described, the exemplary refrigerator 700 includes three cooling loops provided by two cooling systems having three heat exchangers. A first cooling loop includes a chilled liquid cooling system having the liquid-to-air heat exchanger 750 which is coupled with the LCS 220 to transfer heat from the circulating air 740 to the liquid coolant provided by the LCS 220. The first cooling loop includes coolant flow path 701 from the LCS 220 to the input quick disconnect 230, coolant flow path 702 from the input quick disconnect 230 to a CCV 780, coolant flow path 703 from the CCV 780 to the liquid-to-air heat exchanger 750, coolant flow path 704 from the liquid-to-air heat exchanger 750 to the output quick disconnect 235, and coolant flow path 708 from the output quick disconnect 235 to the LCS 220. A second cooling loop includes the thermoelectric cooling system (TECS) having the cold side air heat exchanger 710 which transfer heat from the circulating air 740 through the TED 720 to the heat sink 730, which then transfers the heat to the liquid coolant provided by the LCS 220 as the third heat exchanger of the refrigerator. The second cooling loop includes the coolant flow path 701, coolant flow path 705 from the input quick disconnect 230 to a CCV 790, coolant flow path 706 from the CCV 790 to the heat sink 730, coolant flow path 707 from the heat sink 730 to the output disconnect 235, and coolant flow path 708. The combination of coolant flow paths 702, 703 and 704 and a coolant flow path through the liquid-to-air heat exchanger 750 is in parallel with the combination of coolant flow paths 705, 706 and 707 and a coolant flow path through the heat sink 730. The third cooling loop functions in conjunction with either or both of the cooling systems and includes the circulating air 740 which circulates through the refrigerated compartment 120, the liquid-to-air heat exchanger 750, and the cold side air heat exchanger 710.

A controller 760 may control the operation of one or both of the TECS and the chilled liquid coolant system to maintain a desired temperature within the refrigerated compartment 120. The controller 760 may also control a fan 770 to force the circulating air 740 through the refrigerated compartment 120, the liquid-to-air heat exchanger 750, and the cold side air heat exchanger 710. The controller 760 may coordinate control of the fan 770 with control of the one or both of the TECS and the chilled liquid coolant system.

The controller 760 may control the CCV 780 and the CCV 790 to control the flow of liquid coolant from the LCS 220 into the liquid-to-air heat exchanger 750 and/or the heat sink 730 in a manner similar to that described with reference to the controllers 240, 440, and 660 of FIGS. 2, 4, and 6, respectively. For example, when the TECS is being controlled to cool the circulating air 740 using the cold side air heat exchanger 710 while the liquid-to-air heat exchanger 750 of the chilled liquid coolant system is not being used, the controller 760 may control the CCV 790 to be open and the CCV 780 to be closed such that liquid coolant flows from the LCS 220 through the heat sink 730 while no liquid coolant flows through the liquid-to-air heat exchanger 750. Meanwhile, the controller 760 may control the TED 720 to transfer heat from the cold side air heat exchanger 710 to the heat sink 730.

Alternatively, when the chilled liquid coolant system is being controlled to cool the circulating air 740 using the liquid-to-air heat exchanger 750 while the TED 720 of the TECS is not being used, the controller 760 may control the CCV 790 to be closed and the CCV 780 to be open such that liquid coolant flows from the LCS 220 through the liquid-to-air heat exchanger 750. Meanwhile, the controller 760 may control the TED 720 to be off such that heat is not actively transferred from the cold side air heat exchanger 710 to the heat sink 730 by the electrical operation of the TED 720. When both the liquid-to-air heat exchanger 750 of the chilled liquid coolant system and the TED 720 of the TECS are being controlled to cool the circulating air 740, the controller 760 may cause the CCV 780 to be open such that liquid coolant from the LCS 220 flows through the liquid-to-air heat exchanger 750 and the CCV 790 to be open such that liquid coolant flows through the heat sink 730 to transfer heat away from the TECS into the liquid coolant which is then returned to the LCS 220.

The controller 760 may operate the refrigerator 700 in one of three operating modes in a manner similar to that described with reference to the refrigerator 600 of FIG. 6, except that the TECS of FIG. 7 may be used in place of the refrigerant vapor cycle system of the refrigerator 600. For example, the beverage chiller and refrigerator modes may be operated using the chilled liquid coolant system, while the freezer mode may use the TECS. The TECS and the chilled liquid coolant system may be operated together as a cascade cooling system. During pull-down, both the TECS and the chilled liquid coolant system may be operated in any or all of the three modes. In the beverage chiller and the refrigerator modes after pull-down, the TECS may be turned off. In the freezer mode after pull-down, the TECS may be turned on while the chilled liquid coolant system including the liquid-to-air heat exchanger 750 may be turned off by closing CCV 780 and opening CCV 790.

The controller 760 may operate the TED 720 using a DC power source. The cooling capacity of the TED 720 may be controlled by an amount of DC current input to the TED 720. The TED 720 may be designed to operate using a wide range of input voltages and current values.

The TECS provides a number of advantages over refrigerant vapor cycle systems, especially in applications such as onboard aircraft where reliability, size, and weight are important factors to consider. The TED 720 is an electrical device which may have a solid state construction that functions with no moving parts. Accordingly, the TED 720 may be virtually maintenance free and highly reliable in comparison with refrigerant vapor cycle systems. For example, a typical TED 720 may have a life expectancy greater than 200,000 hours. In addition, the TED 720 may not exhibit mechanical noise and vibration, or electrical noise, unlike mechanical refrigeration systems. Thus, the TED 720 may be ideal for systems in which sensitive electronic sensors are present or acoustic noise is undesirable. Also, a TED 720 may be compact in size, facilitating a more compact and lightweight refrigerator than a comparable mechanical system. The TED 720 may be operable in any orientation and even in zero gravity environments. The TED 720 may control temperatures very precisely, for example to better than +/−0.1 degree C. when used with an appropriate closed-loop temperature control circuit. Thus, the TED 720 may be advantageous when precise temperature control is required. Additionally, the TED 720 may not use or generate any gases, unlike a conventional refrigeration system which may require chlorofluorocarbons or other chemicals that may be harmful to the environment. Also, a TECS may have a lower coefficient of performance (COP) than a vapor cycle system. A TECS may have a COP below 1. As a point of reference, a typical range of COP for an air conditioning unit is 0.4 to 0.7.

Figure 8:
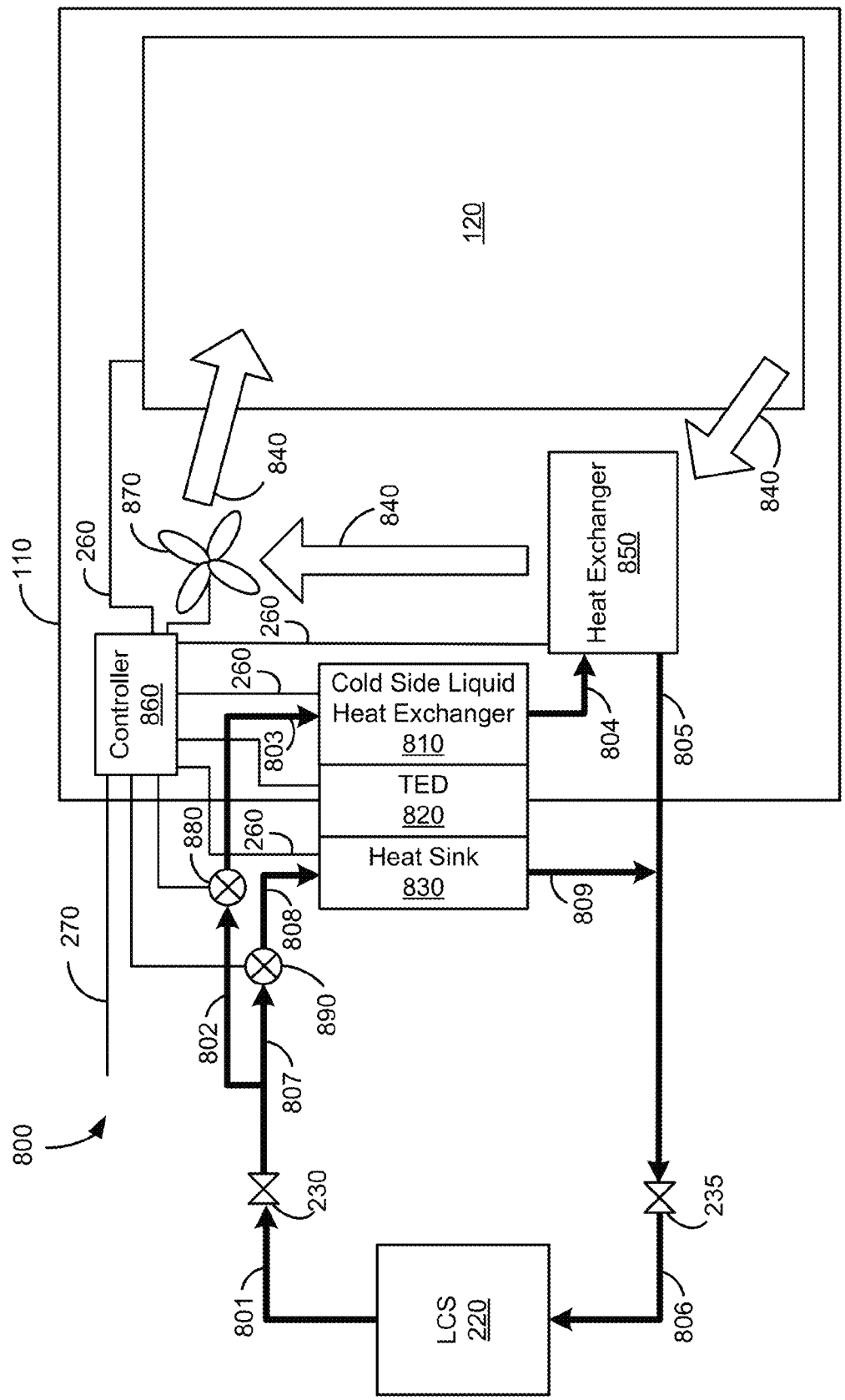
FIG. 8 illustrates an exemplary aircraft galley refrigerator having a thermoelectric cascade cooling system with a cold side liquid heat exchanger.

FIG. 8 illustrates an exemplary aircraft galley refrigerator 800 having a thermoelectric cascade cooling system with a cold side liquid heat exchanger 810. The thermoelectric cooling system (TECS) of the exemplary refrigerator 800 may include one or more thermoelectric devices (TED) 820 coupled with a thermoelectric cold side liquid heat exchanger 810 on one side and a liquid cooled thermoelectric hot side heat sink 830 on the other side. The exemplary refrigerator 800 is similar to the refrigerator 700 illustrated in FIG. 7, except that the cold side air heat exchanger 710 of FIG. 7 is replaced with the cold side liquid heat exchanger 810 in FIG. 8. The cold side liquid heat exchanger 810 may be constructed of a lightweight material which conducts heat, such as an aluminum block. Liquid coolant provided by the LCS 220 may pass through the cold side liquid heat exchanger 810 before passing through a liquid-to-air heat exchanger 850. The cold side liquid heat exchanger 810 may be cooled by the TED 820 to a temperature below that of the liquid coolant provided by the LCS 220. The cold side liquid heat exchanger 810 may then cool the liquid coolant below the temperature at which the liquid coolant is provided by the LCS 220 prior to entering the liquid-to-air heat exchanger 850. Circulating air 840 from the refrigerated compartment 120 which passes through the liquid-to-air heat exchanger 850 may then be cooled to a lower temperature than possible if the liquid-to-air heat exchanger 850 received the liquid coolant directly from the LCS 220.

A first cooling loop includes coolant flow path 801 from the LCS 220 to the input quick disconnect 230, coolant flow path 802 from the input quick disconnect 230 to a CCV 880, coolant flow path 803 from the CCV 880 to the cold side liquid heat exchanger 810, coolant flow path 804 to the liquid-to-air heat exchanger 850, coolant flow path 805 from the liquid-to-air heat exchanger 850 to the output quick disconnect 235, and coolant flow path 806 from the output quick disconnect 235 to the LCS 220. A second cooling loop includes coolant flow path 801, coolant flow path 807 from the input quick disconnect 230 to a CCV 890, coolant flow path 808 from the CCV 890 to the heat sink 830, coolant flow path 809 from the heat sink 830 to the output quick disconnect 235, and coolant flow path 806. The combination of coolant flow paths 807, 808 and 809 with a coolant flow path through the heat sink 830 is in parallel with the combination of coolant flow paths 802, 803, 804, and 805 with the coolant flow paths through the cold side liquid heat exchanger 810 and the heat exchanger 850.

A controller 860 may control the operation of one or both of the TECS and the chilled liquid coolant system to maintain a desired temperature within the refrigerated compartment 120. The controller 860 may also control a fan 870 to force the circulating air 840 through the refrigerated compartment 120 and the liquid-to-air heat exchanger 850. The controller 860 may coordinate control of the fan 870 with control of the one or both of the TECS and the chilled liquid coolant system.

The controller 860 may control the CCV 880 and the CCV 890 to control the flow of liquid coolant from the LCS 220 into the cold side liquid heat exchanger 810, the liquid-to-air heat exchanger 850, and/or the heat sink 830 in a manner similar to that described with reference to the controllers 240, 440, 660, and 760 of FIGS. 2, 4, 6, and 7 respectively. For example, when both the liquid-to-air heat exchanger 850 of the chilled liquid coolant system and the TED 820 of the TECS are being controlled to function together to cool the circulating air 840, the controller 860 may cause the CCV 880 to be open such that liquid coolant from the LCS 220 flows through the cold side liquid heat exchanger 810 as well as the liquid-to-air heat exchanger 850 and the CCV 890 to be open such that liquid coolant flows through the heat sink 830 to transfer heat away from the TECS into the liquid coolant which is then returned to the LCS 220. Meanwhile, the controller 860 may control the TED 820 to transfer heat from the cold side liquid heat exchanger 810 to the heat sink 830 to cool the liquid coolant in the cold side liquid heat exchanger 810 before entering the liquid-to-air heat exchanger 850.

Alternatively, when the chilled liquid coolant system is being controlled to cool the circulating air 840 using the liquid-to-air heat exchanger 850 while the TED 820 of the TECS is not being used, the controller 860 may control the CCV 890 to be closed and the CCV 880 to be open such that liquid coolant flows from the LCS 220 through the liquid-to-air heat exchanger 850. Meanwhile, the controller 860 may control the TED 820 to be off such that heat is not actively transferred (i.e., pumped) from the cold side liquid heat exchanger 810 to the heat sink 830 by the electrical operation of the TED 820.

The controller 860 may operate the refrigerator 800 in one of three operating modes in a manner similar to that described with reference to the refrigerator 700 of FIG. 7. For example, the beverage chiller and refrigerator modes may be operated using the chilled liquid coolant system without using the TECS after pull-down (e.g., by opening CCV 880 and closing CCV 890 while turning off the TED 820), while the freezer mode may use the TECS in addition to the chilled liquid coolant system as a cascade cooling system after pull-down (e.g., by opening both CCV 880 and CCV 890 while turning on the TED 820). Both the TECS and the chilled liquid coolant system may be operated as a cascade cooling system during pull-down in any or all of the three modes.

Although illustrated within the enclosure 110 yet outside the refrigerated compartment 120, in some embodiments, the liquid-to-air heat exchangers illustrated in any of FIGS. 4, 6, 7, and 8 may be partially or fully enclosed within the refrigerated compartment 120. Accordingly, in these embodiments, the associated circulating air, ductwork, and/or fan may be at least partially or fully enclosed within the refrigerated compartment 120. In various embodiments, a plurality of liquid-to-air heat exchangers may be employed where a single liquid-to-air heat exchanger may be illustrated within.

Figure 9:
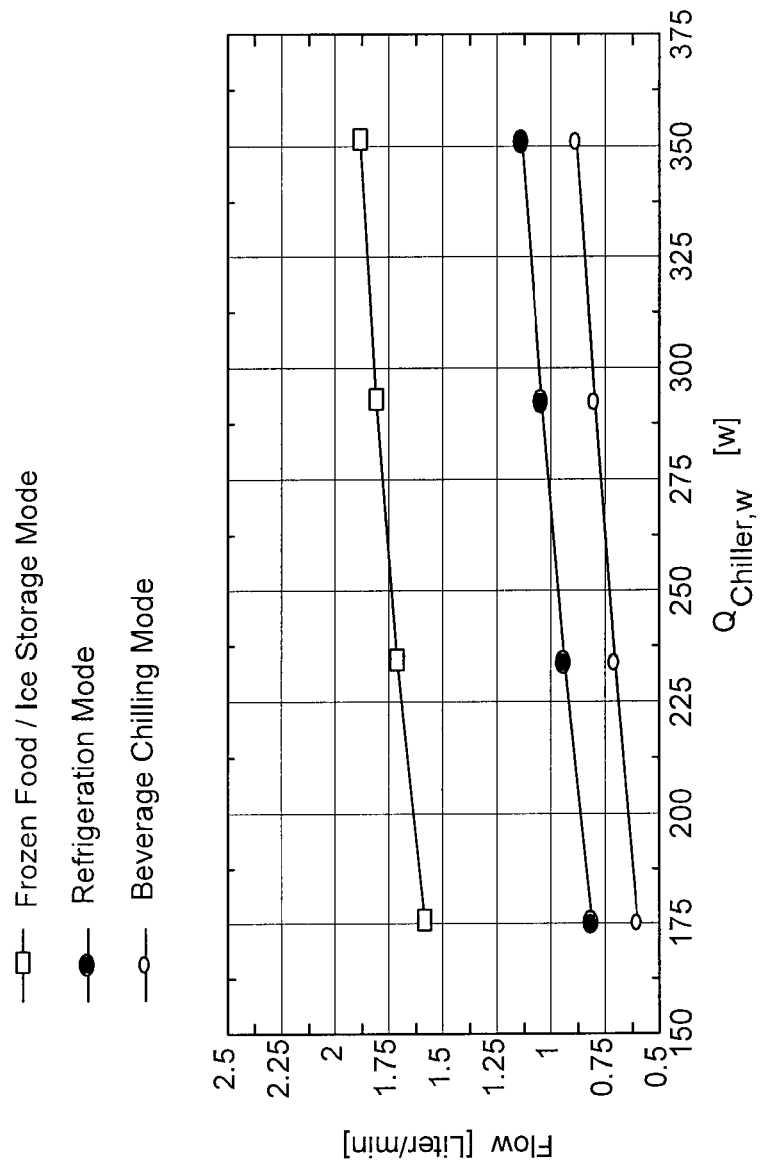
FIG. 9 shows a graph illustrating cooling capacity of an exemplary aircraft galley refrigerator in three operational modes.

FIG. 9 shows a graph illustrating cooling capacity of an exemplary aircraft galley refrigerator in three operational modes. The cooling capacity is expressed in terms of $Q_{Chiller,w}$ [w] at a range of coolant flow rates in units of liters per minute. The exemplary refrigerator may normally operate in an environment with a 29 degree C. ambient temperature and 70% relative humidity. As illustrated in the graph, the exemplary refrigerator operates in an "on the ground" condition with a steady-state heat load ranging from 175 to 351 W (600 to 1200 Btu/h). As shown, the freezer mode has the greatest flow rate, while the beverage chiller mode has the lowest flow rate, at each steady state heat load. The exemplary refrigerator may operate using a three phase 115 VAC power supply having a frequency ranging from 360 to 900 Hz. The exemplary refrigerator may use approximately 149 VA of apparent power, drawing a current of approximately 0.5 amps.

The exemplary refrigerator may have an average pull-down time from room temperature in a beverage chiller mode of approximately 40 minutes to pull down the temperature of 12 bottles to 8 degrees C., while the refrigerator may have an average pull-down time from room temperature in a refrigerator mode of approximately 5 minutes to pull down the temperature of an empty refrigeration compartment 120 to 4 degrees C. In a freezer mode, the refrigerator may have an average pull-down time of the empty refrigeration compartment 120 from room temperature to −18 degrees C. of approximately 15 minutes.

Functions of the exemplary refrigerators described herein may be controlled by a controller according to instructions of a software program stored on a storage medium which may be read and executed by a processor of the controller. The software program may be written in a computer programming language (e.g., C, C++, etc.) and cross-compiled to be executed on the processor of the controller. Examples of the storage medium include magnetic storage media (e.g., floppy disks, hard disks, or magnetic tape), optical recording media (e.g., CD-ROMs or digital versatile disks (DVDs)), and electronic storage media (e.g., integrated circuits (IC's), ROM, RAM, EEPROM, or flash memory). The storage medium may also be distributed over network-coupled computer systems so that the program instructions are stored and executed in a distributed fashion.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements, the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The use of any and all examples, or exemplary language (e.g., "such as") provided herein, is intended merely to better illuminate the invention and does not pose a limitation on the scope of the invention unless otherwise claimed. Moreover, no item or component is essential to the practice of the invention unless the element is specifically described as "essential" or "critical".

As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

It will be recognized that the terms "comprising," "including," and "having," as used herein, are specifically intended to be read as open-ended terms of art. The use of the terms "a" and "and" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

What is claimed is:

1. A refrigeration system for cooling a removable object using a liquid cooling system of a vehicle, the refrigeration system comprising:
a compartment in which an object may be placed and removed;
a chilled liquid coolant system having a connection through which liquid coolant is received from a centralized liquid cooling system of a vehicle, the chilled liquid coolant system not including a vapor compressor and the liquid coolant not undergoing a vapor-compression cycle;
a first heat exchanger having a connection with the chilled liquid coolant system through which the liquid coolant is received and a thermal connection with the compartment that transfers heat from the compartment into the liquid coolant;
a vapor cycle cooling system including a compressor and refrigerant that flows through the compressor and undergoes a vapor-compression cycle;
a second heat exchanger having a connection with the vapor cycle cooling system through which the refrigerant is received and a thermal connection with the compartment that transfers heat from the compartment into the refrigerant;
a liquid-cooled condenser that is connected with both the vapor cycle cooling system and the chilled liquid coolant system, the liquid-cooled condenser receiving the refrigerant from the vapor cycle cooling system and the liquid coolant from the chilled liquid coolant system, and the liquid-cooled condenser including a thermal connection between the chilled liquid coolant system and the vapor cycle cooling system that transfers heat between the refrigerant and the liquid coolant;
a sensor having a sensor data output, the sensor positioned to measure a temperature of air from the compartment and output sensor data representative thereof;
a first coolant control valve having a first control input, the first coolant control valve coupled with the chilled liquid coolant system along a coolant flow path between the liquid cooling system of the vehicle and the first heat exchanger and operable to control a flow of liquid coolant into the first heat exchanger from the liquid cooling system of the vehicle according to the first control input;
a second coolant control valve having a second control input, the second coolant control valve coupled with the chilled liquid coolant system along a coolant flow path between the liquid cooling system of the vehicle and the liquid-cooled condenser and operable to control a flow of coolant into the liquid-cooled condenser from the liquid cooling system of the vehicle according to the second control input; and
a controller coupled with the sensor data output of the sensor, the first control input of the first coolant control valve, and the second control input of the second coolant control valve, the controller configured to control a temperature of the compartment according to the sensor data by transmitting a first control signal to the first control input of the first coolant control valve and a second control signal to the second control input of the second coolant control valve;
wherein the liquid cooled condenser is connected to both the first heat exchanger and the second coolant control valve to receive liquid coolant from either one or both of the first heat exchanger and the second coolant control valve according to the first control signal and the second control signal.

2. The refrigeration system of claim 1, wherein the first heat exchanger includes a liquid-to-air heat exchanger configured to transfer heat from air from the compartment into the liquid coolant.

3. The refrigeration system of claim 1, wherein the second heat exchanger includes an evaporator configured to transfer heat from air from the compartment into the refrigerant.

4. The refrigeration system of claim 1, further comprising a fan positioned to circulate air from the compartment through at least one of the first heat exchanger and the second heat exchanger.

5. A method of operating a refrigeration system for cooling a refrigerated compartment in which an object may be placed and removed, using a liquid cooling system of a vehicle, the method comprising:
receiving liquid coolant by a chilled liquid coolant system from a centralized liquid cooling system of a vehicle, the chilled liquid coolant system not including a vapor compressor and the liquid coolant not undergoing a vapor-compression cycle;
receiving the liquid coolant by a first heat exchanger through a connection with the chilled liquid coolant system;
transferring heat from the compartment into the liquid coolant by the first heat exchanger via a thermal connection with the compartment;
performing a vapor compression cycle of refrigerant that flows through a vapor cycle cooling system including a compressor;
receiving the refrigerant by a second heat exchanger through a connection with the vapor cycle cooling system;
transferring heat from the compartment into the refrigerant by the second heat exchanger via a thermal connection with the compartment;
receiving the refrigerant from the vapor cycle cooling system by a liquid-cooled condenser that is connected with both the vapor cycle cooling system and the chilled liquid coolant system;
receiving the liquid coolant from the chilled liquid coolant system by the liquid-cooled condenser;
transferring heat between the refrigerant and the liquid coolant by the liquid-cooled condenser via a thermal connection between the chilled liquid coolant system and the vapor cycle cooling system;
measuring a temperature of air from the compartment by a sensor having a sensor data output;
outputting sensor data representative of the measured temperature by the sensor via the sensor data output;
controlling a flow of liquid coolant into the first heat exchanger from the liquid cooling system of the vehicle by a first coolant control valve coupled with the chilled liquid coolant system along a coolant flow path between the liquid cooling system of the vehicle and the first heat exchanger according to a first control input from a controller;
controlling a flow of coolant into the liquid-cooled condenser from the liquid cooling system of the vehicle by a second coolant control valve coupled with the chilled liquid coolant system along a coolant flow path between the liquid cooling system of the vehicle and the liquid-cooled condenser according to a second control input from the controller;

receiving the sensor data output from the sensor by the controller; and controlling a temperature of the compartment according to the sensor data by the controller transmitting a first control signal to the first control input of the first coolant control valve and a second control signal to the second control input of the second coolant control valve; wherein the liquid-cooled condenser receives liquid coolant from either one or both of the first heat exchanger and the second coolant control valve according to the first control signal and the second control signal.

6. The method of claim 5, further comprising:

reducing a temperature of the refrigerated compartment to a desired temperature using the chilled liquid coolant system coupled with the centralized liquid cooling system of the vehicle and the vapor cycle cooling system together as a cascade cooling system; and maintaining the temperature of the refrigerated compartment at approximately the desired temperature using the chilled liquid coolant system coupled with the centralized liquid cooling system of the vehicle without using the vapor cycle cooling system when the desired temperature is equal to or greater than approximately 3 degrees C.

7. A refrigeration system for cooling a removable object using a centralized liquid cooling system of a vehicle, the refrigeration system comprising:

a compartment in which an object may be placed and removed;

a chilled liquid coolant system having a connection through which liquid coolant is received from a centralized liquid cooling system of a vehicle which distributes the liquid coolant to a plurality of refrigeration systems, the chilled liquid coolant system not including a vapor compressor and the liquid coolant not undergoing a vapor-compression cycle;

a first heat exchanger proximate the compartment, having a connection with the chilled liquid coolant system through which the liquid coolant is received, and having a thermal connection with the compartment that transfers heat from the compartment into the liquid coolant, the first heat exchanger including at least one heat exchanger selected from the group consisting of a cold wall conduction heat exchanger having a coolant circuit including closed channels through which the liquid coolant circulates and a conduction heat exchanger in thermally conductive contact with a liner of at least one wall of the compartment, and a liquid-to-air heat exchanger having a connection with the chilled liquid coolant system through which the liquid coolant is received and a thermal connection with the compartment that transfers heat from air from the compartment into the liquid coolant;

a vapor cycle cooling system including a compressor and refrigerant that flows through the compressor and undergoes a vapor-compression cycle;

an evaporator proximate the compartment and having a connection with the vapor cycle cooling system through which the refrigerant is received and a thermal connection with the compartment that transfers heat from the compartment into the refrigerant;

a liquid cooled condenser including a condenser refrigerant circuit in fluid communication with the vapor cycle cooling system, a condenser secondary coolant circuit in fluid communication with the chilled liquid coolant system, and a thermal connection between the condenser refrigerant circuit and the condenser secondary coolant circuit that transfers heat from the refrigerant to the liquid coolant;

a sensor having a sensor data output, the sensor positioned to measure a temperature of air from the compartment and output sensor data representative thereof;

a first coolant control valve having a first control input, the first coolant control valve operationally coupled with the chilled liquid coolant system to control a flow of liquid coolant into the first heat exchanger according to the first control input;

a second coolant control valve having a second control input, the second coolant control valve operationally coupled with the vapor cycle cooling system to control a flow of refrigerant into the evaporator according to the second control input; and a controller coupled with the sensor data output of the sensor, the first control input of the first coolant control valve, and the second control input of the second coolant control valve, the controller configured to control a temperature of the compartment according to the sensor data by transmitting a first control signal to the first control input of the first coolant control valve and a second control signal to the second control input of the second coolant control valve.

8. The refrigeration system of claim 7, wherein the first heat exchanger includes a liquid-to-air heat exchanger configured to transfer heat from air from the compartment into the liquid coolant.

9. The refrigeration system of claim 7, further comprising a fan positioned to circulate air from the compartment through at least one of the first heat exchanger and the evaporator.

10. A refrigeration system for cooling a removable object using a centralized liquid cooling system of a vehicle, the refrigeration system comprising:

a compartment in which an object may be placed and removed;

a chilled liquid coolant system having a connection through which liquid coolant is received from a centralized liquid cooling system of a vehicle which distributes the liquid coolant to a plurality of refrigeration systems, the chilled liquid coolant system not including a vapor compressor and the liquid coolant not undergoing a vapor-compression cycle;

a first heat exchanger proximate the compartment, having a connection through which the liquid coolant is received from the chilled liquid coolant system, and having a thermal connection with the compartment that transfers heat from the compartment into the liquid coolant, the first heat exchanger including at least one heat exchanger selected from the group consisting of a cold wall conduction heat exchanger having a coolant circuit including closed channels through which the liquid coolant circulates and a conduction heat exchanger in thermally conductive contact with a liner of at least one wall of the compartment, and a liquid-to-air heat exchanger having a connection with the chilled liquid coolant system through which the liquid coolant is received and a thermal connection with the compartment that transfers heat from air from the compartment into the liquid coolant;

a thermoelectric device coupled with a liquid cooled thermoelectric hot side heat sink and a thermoelectric cold side heat exchanger, the thermoelectric cold side heat exchanger thermally coupled with the compartment, and the liquid cooled thermoelectric hot side heat sink coupled with the chilled liquid coolant system and configured to transfer heat from the compartment via the thermoelectric cold side heat exchanger using the liquid coolant;

a sensor having a sensor data output, the sensor positioned to measure a temperature of air from the compartment and output sensor data representative thereof;

a controller configured to couple with the sensor data output of the sensor, the chilled liquid coolant system, and the thermoelectric device, the controller configured to control a temperature of the compartment according to the sensor data by transmitting a control signal to the chilled liquid coolant system and the thermoelectric device;

a first coolant control valve having a first control input, the first coolant control valve coupled with the chilled liquid coolant system along a coolant flow path between the liquid cooling system of the vehicle and the first heat exchanger and operable to control a flow of liquid coolant into the first heat exchanger from the liquid cooling system of the vehicle according to the first control input; and a second coolant control valve having a second control input, the second coolant control valve coupled with the chilled liquid coolant system along a coolant flow path between the liquid cooling system of the vehicle and the liquid cooled thermoelectric hot side heat sink and operable to control a flow of coolant into the liquid cooled thermoelectric hot side heat sink from the liquid cooling system of the vehicle according to the second control input;

wherein the controller is coupled with the first control input of the first coolant control valve and the second control input of the second coolant control valve, the controller configured to control a temperature of the compartment according to the sensor data by transmitting a first control signal to the first control input of the first coolant control valve and a second control signal to the second control input of the second coolant control valve.

11. The refrigeration system of claim 10, wherein the thermoelectric cold side heat exchanger includes a cold side air heat exchanger configured to transfer heat from air from the compartment to the thermoelectric device, the thermoelectric device transferring the heat to the liquid cooled thermoelectric hot side heat sink which subsequently transfers the heat into the liquid coolant.

12. The refrigeration system of claim 10, wherein the first heat exchanger includes a liquid-to-air heat exchanger configured to transfer heat from air from the compartment into the liquid coolant.

13. The refrigeration system of claim 10, further comprising a fan positioned to circulate air from the compartment through both the first heat exchanger and the thermoelectric cold side heat exchanger.

14. A refrigeration system for cooling a removable object using a centralized liquid cooling system of a vehicle, the refrigeration system comprising:

a compartment in which an object may be placed and removed;

a chilled liquid coolant system having a connection through which liquid coolant is received from a centralized liquid cooling system of a vehicle which distributes the liquid coolant to a plurality of refrigeration systems, the chilled liquid coolant system not including a vapor compressor and the liquid coolant not undergoing a vapor-compression cycle;

a thermoelectric device coupled with a liquid cooled thermoelectric hot side heat sink and a thermoelectric cold side liquid heat exchanger, the liquid cooled thermoelectric hot side heat sink and the thermoelectric cold side liquid heat exchanger both coupled with the chilled liquid coolant system in parallel to receive the liquid coolant from the centralized liquid cooling system of the vehicle and configured to transfer heat from the liquid coolant that flows through the thermoelectric cold side liquid heat exchanger via the thermoelectric device into the liquid coolant that flows through the liquid cooled thermoelectric hot side heat sink before the liquid coolant from the liquid cooled thermoelectric hot side heat sink returns to the liquid cooling system of the vehicle;

a compartment liquid heat exchanger proximate the compartment, having a connection through which the liquid coolant is received from the thermoelectric cold side liquid heat exchanger, and having a thermal connection with the compartment that transfers heat from the compartment into the liquid coolant, the compartment liquid heat exchanger including at least one heat exchanger selected from the group consisting of a cold wall conduction heat exchanger having a coolant circuit including closed channels through which the liquid coolant circulates and a conduction heat exchanger in thermally conductive contact with a liner of at least one wall of the compartment, and a liquid-to-air heat exchanger having a connection with the chilled liquid coolant system through which the liquid coolant is received and a thermal connection with the compartment that transfers heat from air from the compartment into the liquid coolant;

a first coolant control valve having a first control input, the first coolant control valve coupled with the chilled liquid coolant system along a coolant flow path between the liquid cooling system of the vehicle and the liquid cooled thermoelectric hot side heat sink and operable to control a flow of liquid coolant into the liquid cooled thermoelectric hot side heat sink from the liquid cooling system of the vehicle according to the first control input;

a second coolant control valve having a second control input, the second coolant control valve coupled with the chilled liquid coolant system along a coolant flow path between the liquid cooling system of the vehicle and the thermoelectric cold side liquid heat exchanger and operable to control a flow of coolant into the thermoelectric cold side liquid heat exchanger from the liquid cooling system of the vehicle according to the second control input;

a sensor having a sensor data output, the sensor positioned to measure a temperature of air from the compartment and output sensor data representative thereof; and a controller configured to couple with the sensor data output of the sensor, the first control input of the first coolant control valve, the second control input of the second coolant control valve, and the thermoelectric device, the controller configured to control a temperature of the compartment according to the sensor data by transmitting a first control signal to the first control input of the first coolant control valve, a second control signal to the second control input of the second coolant control valve, and a third control signal to the thermoelectric device.

15. The refrigeration system of claim 14, wherein the first heat exchanger includes a liquid-to-air heat exchanger configured to transfer heat from air from the compartment into the liquid coolant.

16. The refrigeration system of claim 14, further comprising a fan positioned to circulate air from the compartment through the compartment liquid heat exchanger.

17. The method of claim 6, further comprising maintaining the temperature of the refrigerated compartment at approximately the desired temperature using the chilled liquid coolant system coupled with the centralized liquid cooling system of the vehicle and the vapor cycle cooling system together as a cascade cooling system when the desired temperature is less than approximately 0 degrees C.

18. A method of operating a refrigeration system for cooling a refrigerated compartment in which an object may be placed and removed, using a centralized liquid cooling system of a vehicle, the method comprising:
  receiving liquid coolant by a chilled liquid coolant system from a centralized liquid cooling system of a vehicle that distributes the liquid coolant to a plurality of refrigeration systems, the chilled liquid coolant system not including a vapor compressor and the liquid coolant not undergoing a vapor-compression cycle;
  receiving the liquid coolant by a first heat exchanger proximate the compartment through a connection with the chilled liquid coolant system, the first heat exchanger including at least one heat exchanger selected from group consisting of a cold wall conduction heat exchanger having a coolant circuit including closed channels through which the liquid coolant circulates and a conduction heat exchanger in thermally conductive contact with a liner of at least one wall of the compartment, and a liquid-to-air heat exchanger having a connection with the chilled liquid coolant system through which the liquid coolant is received and a thermal connection with the compartment that transfers heat from air from the compartment into the liquid coolant;
  transferring heat from the compartment into the liquid coolant by the first heat exchanger, wherein when the first heat exchanger includes the conduction heat exchanger, the transferring includes conducting heat from the liner of the at least one wall of the compartment and the conduction heat exchanger via the thermally conductive contact, and when the first heat exchanger includes the liquid-to-air heat exchanger, the transferring includes transferring heat from air from the compartment into the liquid coolant via the liquid-to-air heat exchanger's thermal connection with the compartment;
  performing a vapor compression cycle of refrigerant that flows through a vapor cycle cooling system including a compressor;
  receiving the refrigerant by an evaporator proximate the compartment through a connection with the vapor cycle cooling system;
  transferring heat from the compartment into the refrigerant by the evaporator via a thermal connection with the compartment;
  receiving the refrigerant from the vapor cycle cooling system by a liquid-cooled condenser that is connected with both the vapor cycle cooling system and the chilled liquid coolant system;
  receiving the liquid coolant from the chilled liquid coolant system by the liquid-cooled condenser;
  transferring heat between the refrigerant and the liquid coolant by the liquid-cooled condenser via a thermal connection between a condenser secondary coolant circuit in fluid communication with the chilled liquid coolant system and a condenser refrigerant circuit in fluid communication with the vapor cycle cooling system;
  measuring a temperature of air from the compartment by a sensor having a sensor data output;
  outputting sensor data representative of the measured temperature by the sensor via the sensor data output;
  controlling a flow of liquid coolant into the first heat exchanger from the liquid cooling system of the vehicle by a first coolant control valve operationally coupled with the chilled liquid coolant system according to a first control input from a controller;
  controlling a flow of refrigerant into the evaporator by a second coolant control valve operationally coupled with the vapor cycle cooling system according to a second control input from the controller;
  receiving the sensor data output from the sensor by the controller; and
  controlling a temperature of the compartment according to the sensor data by the controller transmitting a first control signal to the first control input of the first coolant control valve and a second control signal to the second control input of the second coolant control valve.

19. The method of claim 18, further comprising:
  reducing a temperature of the refrigerated compartment to a desired temperature using the chilled liquid coolant system coupled with the centralized liquid cooling system of the vehicle and the vapor cycle cooling system together as a cascade cooling system; and
  maintaining the temperature of the refrigerated compartment at approximately the desired temperature using the chilled liquid coolant system coupled with the centralized liquid cooling system of the vehicle without using the vapor cycle cooling system when the desired temperature is equal to or greater than approximately 3 degrees C.

20. The method of claim 19, further comprising maintaining the temperature of the refrigerated compartment at approximately the desired temperature using the chilled liquid coolant system coupled with the centralized liquid cooling system of the vehicle and the vapor cycle cooling system together as a cascade cooling system when the desired temperature is less than approximately 0 degrees C.

21. A method of operating a refrigeration system for cooling a refrigerated compartment in which an object may be placed and removed, using a centralized liquid cooling system of a vehicle, the method comprising:
  receiving liquid coolant by a chilled liquid coolant system from a centralized liquid cooling system of a vehicle that distributes the liquid coolant to a plurality of refrigeration systems, the chilled liquid coolant system not including a vapor compressor and the liquid coolant not undergoing a vapor-compression cycle;
  receiving the liquid coolant by a first heat exchanger proximate the compartment through a connection with the chilled liquid coolant system, the first heat exchanger including at least one heat exchanger selected from group consisting of a cold wall conduction heat exchanger having a coolant circuit including closed channels through which the liquid coolant circulates and a conduction heat exchanger in thermally conductive contact with a liner of at least one wall of the compartment, and a liquid-to-air heat exchanger having a connection with the chilled liquid coolant system through which the liquid coolant is received and a thermal connection with the compartment that transfers heat from air from the compartment into the liquid coolant;

transferring heat from the compartment into the liquid coolant by the first heat exchanger, wherein when the first heat exchanger includes the conduction heat exchanger, the transferring includes conducting heat from the liner of the at least one wall of the compartment and the conduction heat exchanger via the thermally conductive contact, and when the first heat exchanger includes the liquid-to-air heat exchanger, the transferring includes transferring heat from air from the compartment into the liquid coolant via the liquid-to-air heat exchanger's thermal connection with the compartment;

receiving the liquid coolant from the chilled liquid coolant system by a liquid cooled thermoelectric hot side heat sink coupled with a first side of a thermoelectric device, a second side of the thermoelectric device coupled with a thermoelectric cold side heat exchanger that is thermally coupled with the compartment;

transferring heat from the compartment by the thermoelectric device via the thermoelectric cold side heat exchanger using the liquid coolant;

measuring a temperature of air from the compartment by a sensor having a sensor data output;

outputting sensor data representative of the measured temperature by the sensor via the sensor data output;

controlling a flow of liquid coolant into the first heat exchanger from the liquid cooling system of the vehicle by a first coolant control valve coupled with the chilled liquid coolant system along a coolant flow path between the liquid cooling system of the vehicle and the first heat exchanger according to a first control input from a controller;

controlling a flow of liquid coolant into the liquid cooled thermoelectric hot side heat sink from the liquid cooling system of the vehicle by a second coolant control valve coupled with the chilled liquid coolant system along a coolant flow path between the liquid cooling system of the vehicle and the liquid cooled thermoelectric hot side heat sink according to a second control input from the controller;

receiving the sensor data output from the sensor by the controller; and controlling a temperature of the compartment according to the sensor data by the controller transmitting a first control signal to the first control input of the first coolant control valve, a second control signal to the second control input of the second coolant control valve, and a third control signal to the thermoelectric device.

22. The method of claim 21, further comprising maintaining the temperature of the refrigerated compartment at approximately the desired temperature using the thermoelectric device without using the chilled liquid coolant system coupled with the liquid cooling system of the vehicle when the desired temperature is less than approximately 0 degrees C.

23. A method of operating a refrigeration system for cooling a refrigerated compartment in which an object may be placed and removed, using a centralized liquid cooling system of a vehicle, the method comprising:

receiving liquid coolant by a chilled liquid coolant system from a centralized liquid cooling system of a vehicle that distributes the liquid coolant to a plurality of refrigeration systems, the chilled liquid coolant system not including a vapor compressor and the liquid coolant not undergoing a vapor-compression cycle;

receiving the liquid coolant from the chilled liquid coolant system by a liquid cooled thermoelectric hot side heat sink coupled with a first side of a thermoelectric device;

receiving the liquid coolant from the chilled liquid coolant system by a thermoelectric cold side liquid heat exchanger coupled with a second side of the thermoelectric device, the thermoelectric cold side liquid heat exchanger and the liquid cooled thermoelectric hot side heat sink receiving the liquid coolant in parallel with one another;

transferring heat from the liquid coolant that flows through the thermoelectric cold side liquid heat exchanger by the thermoelectric device into the liquid coolant that flows through the liquid cooled thermoelectric hot side heat sink before the liquid coolant from the liquid cooled thermoelectric hot side heat sink returns to the liquid cooling system of the vehicle;

receiving the liquid coolant by a compartment liquid heat exchanger proximate the compartment through a connection with the chilled liquid coolant system, the compartment liquid heat exchanger including at least one heat exchanger selected from group consisting of a cold wall conduction heat exchanger having a coolant circuit including closed channels through which the liquid coolant circulates and a conduction heat exchanger in thermally conductive contact with a liner of at least one wall of the compartment, and a liquid-to-air heat exchanger having a connection with the chilled liquid coolant system through which the liquid coolant is received and a thermal connection with the compartment that transfers heat from air from the compartment into the liquid coolant;

transferring heat from the compartment into the liquid coolant by the compartment liquid heat exchanger, wherein when the compartment liquid heat exchanger includes the conduction heat exchanger, the transferring includes conducting heat from the liner of the at least one wall of the compartment and the conduction heat exchanger via the thermally conductive contact, and when the compartment liquid heat exchanger includes the liquid-to-air heat exchanger, the transferring includes transferring heat from air from the compartment into the liquid coolant via the liquid-to-air heat exchanger's thermal connection with the compartment;

controlling a flow of liquid coolant into the liquid cooled thermoelectric hot side heat sink from the liquid cooling system of the vehicle by a first coolant control valve coupled with the chilled liquid coolant system along a coolant flow path between the liquid cooling system of the vehicle and the liquid cooled thermoelectric hot side heat according to a first control input from a controller;

controlling a flow of liquid coolant into the thermoelectric cold side liquid heat exchanger from the liquid cooling system of the vehicle by a second coolant control valve coupled with the chilled liquid coolant system along a coolant flow path between the liquid cooling system of the vehicle and the thermoelectric cold side liquid heat exchanger according to a second control input from the controller;

measuring a temperature of air from the compartment by a sensor having a sensor data output;

outputting sensor data representative of the measured temperature by the sensor via the sensor data output;

receiving the sensor data output from the sensor by the controller; and controlling a temperature of the compartment according to the sensor data by the controller transmitting a first control signal to the first control input of the first coolant control valve, a second control signal to the second control input of the second coolant control valve, and a third control signal to the thermoelectric device.

24. The method of claim 23, further comprising maintaining the temperature of the refrigerated compartment at approximately the desired temperature using the thermoelectric device without using the chilled liquid coolant system coupled with the liquid cooling system of the vehicle when the desired temperature is less than approximately 0 degrees C.

\* \* \* \* \*